(12) United States Patent
Yang et al.

(10) Patent No.: US 11,265,174 B2
(45) Date of Patent: Mar. 1, 2022

(54) METHOD, APPARATUS, AND DEVICE FOR PROCESSING BLOCKCHAIN DATA

(71) Applicant: Alipay (Hangzhou) Information Technology Co., Ltd., Zhejiang (CN)

(72) Inventors: Wenyu Yang, Zhejiang (CN); Honglin Qiu, Zhejiang (CN); Ying Yan, Zhejiang (CN); Shubo Li, Zhejiang (CN); Yuan Chen, Zhejiang (CN); Hanghang Wu, Zhejiang (CN); Renhui Yang, Zhejiang (CN); Qin Liu, Zhejiang (CN)

(73) Assignee: Alipay (Hangzhou) Information Technology Co., Ltd., Zhejiang (CN)

(*) Notice: Subject to any disclaimer, the term of this patent is extended or adjusted under 35 U.S.C. 154(b) by 0 days.

(21) Appl. No.: 17/358,562

(22) Filed: Jun. 25, 2021

(65) Prior Publication Data
US 2022/0038292 A1 Feb. 3, 2022

(30) Foreign Application Priority Data
Jul. 31, 2020 (CN) .......................... 202010756311.6

(51) Int. Cl.
*H04L 9/32* (2006.01)

(52) U.S. Cl.
CPC ............ *H04L 9/3247* (2013.01); *H04L 9/321* (2013.01); *H04L 9/3242* (2013.01); *H04L 2209/38* (2013.01); *H04L 2209/56* (2013.01)

(58) Field of Classification Search
CPC ..... H04L 9/3247; H04L 9/3242; H04L 9/321; H04L 2209/56; H04L 2209/38
See application file for complete search history.

(56) References Cited

U.S. PATENT DOCUMENTS 10,762,516 B2* 9/2020 Lane ..................... G06Q 50/01
10,991,189 B2* 4/2021 Moeller .................. G07C 9/21
(Continued)

FOREIGN PATENT DOCUMENTS

CN 108833330 A 11/2018
CN 109544160 A 3/2019
(Continued)

OTHER PUBLICATIONS

Extended European Search Report in European Application No. 21181021.3, dated Nov. 19, 2021.

*Primary Examiner* — Christopher A Revak
(74) *Attorney, Agent, or Firm* — Finnegan, Henderson, Farabow, Garrett & Dunner, LLP

(57) ABSTRACT

A method for processing blockchain data is applied to a terminal device provided with a trusted execution environment and includes: acquiring, from a blockchain, data to be verified of a target service, the data to be verified including circulation data generated during execution of the target service and recorded in the blockchain; determining, based on the target service, a relevant third-party authority for verifying authenticity of the data to be verified, and acquiring benchmark circulation data generated during the execution of the target service and recorded in the third-party authority; transferring the data to be verified and the benchmark circulation data to the trusted execution environment through a first trusted application on the terminal device; and determining whether the data to be verified meets a verification rule, and outputting a verification result of the data to be verified.

20 Claims, 7 Drawing Sheets

(56) References Cited

U.S. PATENT DOCUMENTS

| | | | |
|---|---|---|---|
| 2018/0254898 A1 | 9/2018 | Sprague et al. | |
| 2019/0188712 A1 | 6/2019 | Fedorov et al. | |
| 2020/0250752 A1* | 8/2020 | Sugarman | H04L 9/3239 |
| 2021/0149365 A1* | 5/2021 | Irwin | H04L 9/0637 |
| 2021/0294913 A1* | 9/2021 | Mackenzie | G06Q 10/10 |

FOREIGN PATENT DOCUMENTS

| | | |
|---|---|---|
| CN | 110264220 A | 3/2019 |
| CN | 111339536 A | 3/2019 |
| CN | 110011793 A | 7/2019 |
| CN | 110210702 A | 9/2019 |
| CN | 111459932 A | 7/2020 |

\* cited by examiner

METHOD, APPARATUS, AND DEVICE FOR PROCESSING BLOCKCHAIN DATA

CROSS-REFERENCE TO RELATED APPLICATIONS

The present application is based upon and claims priority to Chinese Patent Application No. 202010756311.6, filed on Jul. 31, 2020, the entire content of which is incorporated herein by reference.

TECHNICAL FIELD

The present specification relates to the field of computer technologies, and in particular, to a method, an apparatus, and a device for processing blockchain data.

BACKGROUND

A blockchain has been well applied in the direction of anti-tampering, anti-counterfeiting, and traceability of online data. In order to ensure integrity of data and prevent tampering, the data may be uploaded to the blockchain for deposition.

If relevant data in a certain service (such as a payment service, a logistics service, and a fundraising and funding service) is added to a blockchain, the data cannot be changed and repudiated. However, whether data uploaded to a blockchain is real data and how to verify the data in the blockchain safely and reliably have become an important problem that needs to be solved. Therefore, it is necessary to provide a technical solution for performing safe and reliable verification on data in a blockchain.

SUMMARY

According to a first aspect of embodiments of the present specification, a method for processing blockchain data is applied to a terminal device provided with a trusted execution environment and includes: acquiring data, from a blockchain, to be verified of a target service, the data to be verified including circulation data generated during execution of the target service and recorded in the blockchain; determining, based on the target service, a relevant third-party authority for verifying authenticity of the data to be verified, and acquiring benchmark circulation data generated during the execution of the target service and recorded in the third-party authority; and transferring the data to be verified and the benchmark circulation data to the trusted execution environment of the terminal device through a first trusted application for performing data verification processing on the terminal device, wherein the trusted execution environment is provided with a verification rule for performing data verification on the data to be verified for the first trusted application; and determining whether the data to be verified meets the verification rule by using the trusted execution environment and based on the circulation data in the data to be verified and the benchmark circulation data, and outputting a verification result of the data to be verified.

According to a second aspect of embodiments of the present specification, a device for processing blockchain data is provided with a trusted execution environment and includes: a processor; and a memory storing instructions executable by the processor, wherein the processor is configured to: acquire, from a blockchain, data to be verified of a target service, the data to be verified including circulation data generated during execution of the target service and recorded in the blockchain; determine, based on the target service, a relevant third-party authority for verifying authenticity of the data to be verified, and acquire benchmark circulation data generated during the execution of the target service and recorded in the third-party authority; transfer the data to be verified and the benchmark circulation data to the trusted execution environment of the device through a first trusted application for performing data verification processing on the device, wherein the trusted execution environment is provided with a verification rule for performing data verification on the data to be verified for the first trusted application; and determine whether the data to be verified meets the verification rule by using the trusted execution environment and based on the circulation data in the data to be verified and the benchmark circulation data, and output a verification result of the data to be verified.

According to a third aspect of embodiments of the present specification, a non-transitory computer-readable storage medium has stored therein instructions that, when executed by a processor of a terminal device, cause the terminal device to perform a method for processing blockchain data, the terminal device being provided with a trusted execution environment, the method including: acquiring data, from a blockchain, to be verified of a target service, the data to be verified including circulation data generated during execution of the target service and recorded in the blockchain; determining, based on the target service, a relevant third-party authority for verifying authenticity of the data to be verified, and acquiring benchmark circulation data generated during the execution of the target service and recorded in the third-party authority; and transferring the data to be verified and the benchmark circulation data to the trusted execution environment of the terminal device through a first trusted application for performing data verification processing on the terminal device, wherein the trusted execution environment is provided with a verification rule for performing data verification on the data to be verified for the first trusted application; and determining whether the data to be verified meets the verification rule by using the trusted execution environment and based on the circulation data in the data to be verified and the benchmark circulation data, and outputting a verification result of the data to be verified.

BRIEF DESCRIPTION OF THE DRAWINGS

The accompanying drawings, which are incorporated in and constitute a part of this specification, illustrate embodiments and, together with the description, serve to explain the principles of the specification.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The described embodiments are merely examples of rather than all the embodiments of the present specification.

Figure 1:
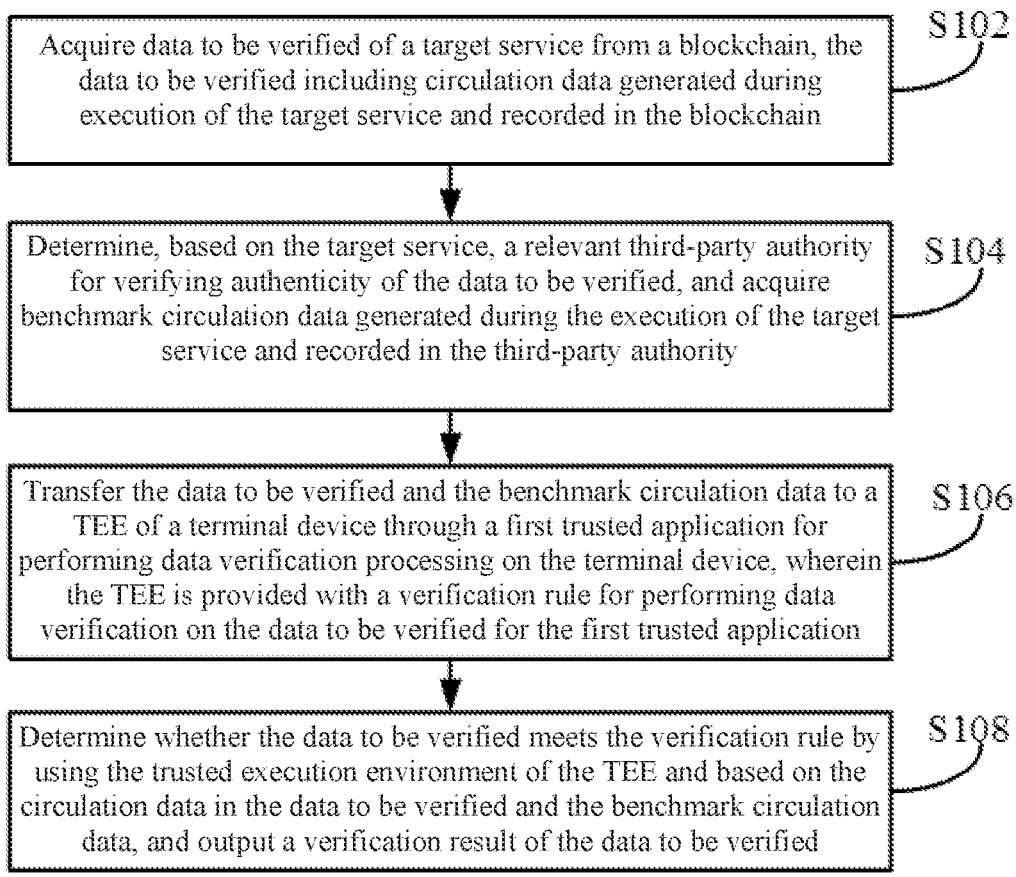
FIG. 1 is a flowchart of a method for processing blockchain data according to an embodiment.

FIG. 1 is a flowchart of a method for processing blockchain data according to an embodiment. The method may be performed by a terminal device, wherein the terminal device may be a computer device such as a laptop computer or a desktop computer. The terminal device may be a terminal device for performing data verification on data that has been uploaded to a blockchain. The terminal device may be provided with a trusted execution environment. The trusted execution environment may be a TEE (Trusted Execution Environment), may be implemented by a program written in a predetermined programming language (that is, it may be implemented in the form of software), and may be a safe operation environment for data processing. The method may also be performed by a server and the like. The server may be an independent server, a server cluster composed of multiple servers, or the like. The server may also be provided with the trusted execution environment TEE. The present embodiment takes the method being performed by a terminal device as an example for description. For a case where the method is performed is a server, the method may be performed with reference to the following related content. The method may include the following steps.

In step S102, data to be verified of a target service is acquired from a blockchain, the data to be verified including circulation data generated during execution of the target service and recorded in the blockchain.

The target service may be any service, such as an online commodity transaction service, a charity service, and a public welfare service. The blockchain may be any public blockchain, private blockchain, consortium blockchain, or the like. The blockchain may store designated data, and the data in the blockchain has the advantages of anti-tampering and traceability. Circulation data may be data generated during execution of a certain service from the beginning of the execution of the service to the completion of the execution of the service. For example, during execution of service A, service A1 needs to be executed first, then service A2 is executed, and finally the execution of service A is completed. Then, data generated during the execution of service A1, data generated during the execution of service A2, and data other than service A1 and service A2 may constitute circulation data generated during the execution of service A.

In an embodiment, in order to ensure the integrity of data and prevent tampering, the data may be uploaded to a blockchain. For example, for each service, during execution of the service, not only initial data of executing the service and an execution result of the service are included, a large amount of intermediate data between the initial data and the execution result is generally contained. The initial data, the intermediate data, and the execution result of the service may be uploaded to a blockchain for storing and verification. Therefore, for a target service, circulation data generated during execution of the target service may also be recorded in a blockchain in the above manner. For example, a service provider of the target service may set up a corresponding service processing procedure according to the target service, and an application used on a user side and a corresponding application used on a service side may be set accordingly. The application used on the user side may be installed in a terminal device of the user, and the application used on the service side may be installed in a service server. When the user needs to execute the target service, the application may be started. The application provides an entry to the target service (such as a trigger button of the target service or a hyperlink of the target service), and the terminal device of the user may trigger execution of the target service through the entry and may send a service processing request to the service server. The service server may acquire an execution procedure of the target service, and may execute the target service based on the execution procedure. The target service may also be executed through interaction with the terminal device. In the process of executing the target service, the service server may record the circulation data generated during the execution of the target service, and may upload the recorded circulation data to the blockchain. In some embodiments, the circulation data can be uploaded to the blockchain after the service server executes the target service, or the generated data can be uploaded to the blockchain whenever a certain amount of circulation data is generated during the execution of the target service by the service server, or the service server can upload the data generated in real time to the blockchain, so that the circulation data generated during the execution of the target service can be recorded in the blockchain. Moreover, in order to ensure the integrity of the data, the service server may also upload data related to the target service to the blockchain.

Figure 2:
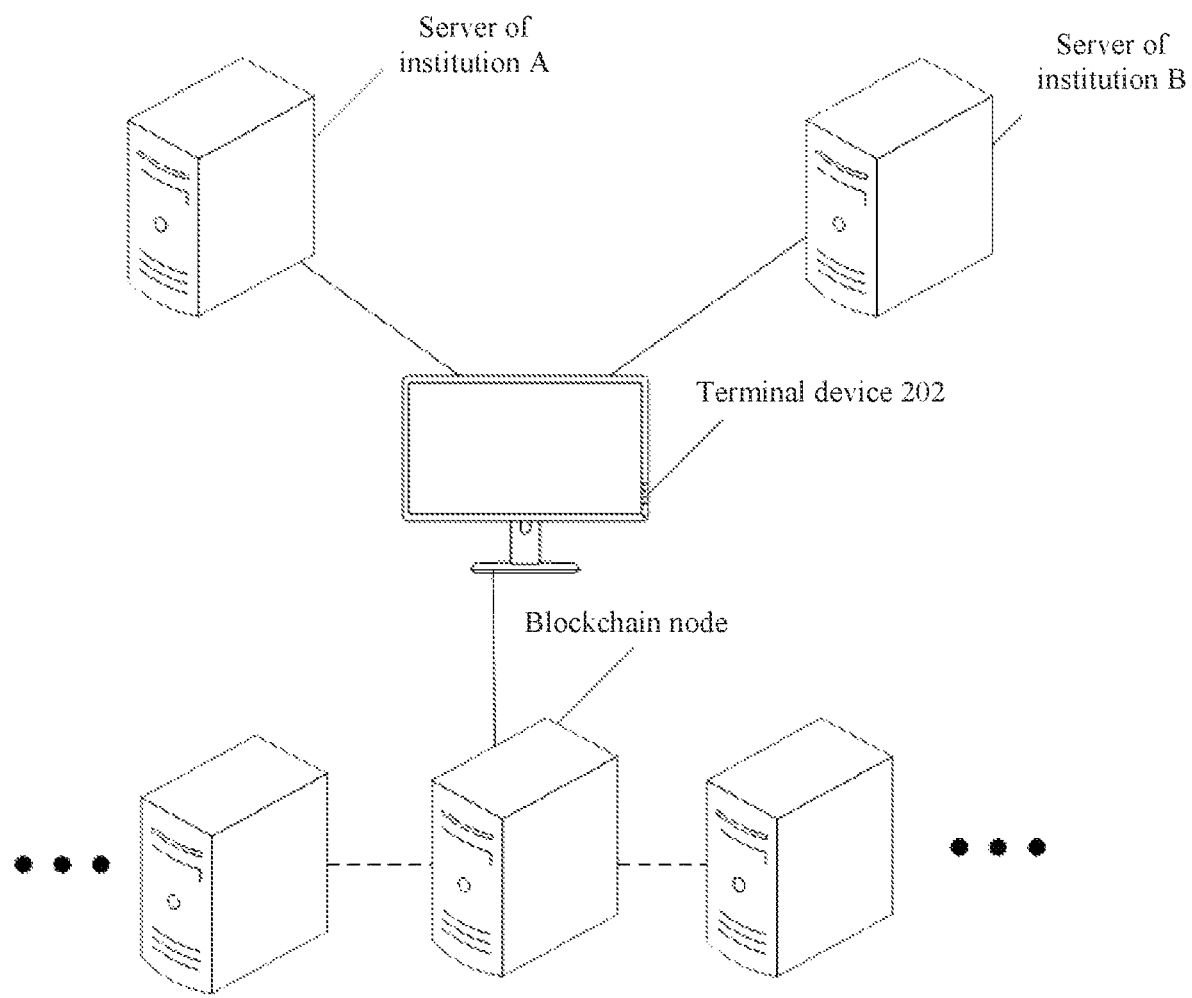
FIG. 2 is a schematic diagram of a system for processing blockchain data according to an embodiment.

FIG. 2 is a schematic diagram of a system for processing blockchain data according to an embodiment. As shown in FIG. 2, in order to perform data verification on the data that has been uploaded to the blockchain (i.e., data to be verified), a terminal device 202 for data verification on the data to be verified may be preset, and an application for performing the above verification function may be installed in the terminal device 202. Correspondingly, an application for triggering verification on data in the blockchain may also be installed in a terminal device of a user, and the user may initiate a data verification request through the application. To this end, a data verification entry (such as a data verification button or a hyperlink) may be set in the application. If the user needs to verify certain data in the blockchain (that is, data to be verified), a corresponding verification request may be sent through the data verification entry. For example, the user may click the data verification button or hyperlink, and the terminal device 202 may receive the verification request. At this time, the terminal device 202 may analyze the verification request and determine a target service corresponding to the verification request. Then, the terminal device 202 may acquire data to be verified from the blockchain, wherein the data to be verified may include circulation data generated during execution of the target service and recorded in the blockchain.

In addition, the processing that triggers the execution of the target service may be varied. In addition to the above method, a data verification period may also be preset. Whenever the set data verification period is reached, the terminal device 202 may acquire the data to be verified of the target service from the blockchain.

In step S104, based on the target service, a relevant third-party authority for verifying authenticity of the data to be verified is determined, and benchmark circulation data generated during the execution of the target service and recorded in the third-party authority is acquired.

The relevant third-party authority for verifying the authenticity of the data to be verified may be an institution that is authoritative to some extent. For example, it may be a public institution established by a country, a local city, or a certain region, such as a bank and a traffic supervision department, and may also be an institution established by an individual or an organization, such as a company. The benchmark circulation data may be real or actual circulation data generated during execution of a certain service.

In an embodiment, many sub-services may be involved during the execution of the target service, and data of different sub-services may require different institutions to provide benchmark circulation data. Therefore, after the data to be verified of the target service is acquired, the target service may be analyzed, and information of sub-services contained therein (such as identifiers or types of the sub-services) may be determined, or information of the sub-services contained in the target service may be determined through data types (such as payment and logistics) contained in the data to be verified. Then, according to the information of the sub-services contained in the target service, the relevant third-party authority for verifying the authenticity of the data to be verified may be determined. For example, as described in the above example, during the execution of service A, service A1 needs to be executed first, and then service A2 is executed. Finally, the execution of service A is completed. Based on this, a third-party authority corresponding to service A1 and a third-party authority corresponding to service A2 can be acquired, and the acquired two third-party authorities can be determined as relevant third-party authorities for verifying the authenticity of the data to be verified.

After the relevant third-party authorities are determined, a data acquisition request for the target service may be sent to each third-party authority. After receiving the data acquisition request, a server of the third-party authority may acquire, for the target service, recorded circulation data generated during the execution of the target service. The acquired circulation data may be sent to the terminal device as benchmark circulation data, so that the terminal device may acquire the benchmark circulation data generated during the execution of the target service recorded in each of the above third-party authorities.

In step S106, the data to be verified and the benchmark circulation data are transferred to the TEE of the terminal device through a first trusted application for performing data verification processing on the terminal device, wherein the TEE is provided with a verification rule for performing data verification on the data to be verified for the first trusted application.

The TEE may be a trusted execution environment. The TEE may be implemented through a program written in a predetermined programming language (that is, it may be implemented in the form of software). The trusted execution environment of the TEE may be a data processing environment that is safe and isolated from other environments, that is, processing executed in the trusted execution environment and data generated during data processing cannot be accessed by other execution environments or applications outside the trusted execution environment. The trusted execution environment of the TEE may be realized by creating a small operating system that may run independently in a trusted zone (such as a TrustZone), and the TEE may directly provide a service in the form of system calling (such as being directly processed by a TrustZone kernel). The terminal device may include an REE (Rich Execution Environment) and the TEE, the operating system such as Android operating system, iOS operating system, Windows operating system, and Linux operating system installed on the terminal device may be run under the REE. The characteristics of the REE may include powerful functions, openness, and scalability, and may provide upper-level applications with all the functions of the terminal device, such as a camera function and a touch function. However, there may be security risks in the REE. For example, the operating system may acquire all data of an application, but it is difficult to verify whether the operating system or the application has been tampered with. If it is tampered with, information of the user will have a great security risk. Therefore, the TEE in the terminal device may be required for processing. The TEE has its own execution space, which means that there is also an operating system under the TEE. The TEE has a higher security level than the REE. Software and hardware resources in the terminal device that the TEE can access are separated from the REE, but the TEE may directly acquire information of the REE, while the REE may not acquire information of the TEE. The TEE may perform verification and other processing through a provided interface, so as to ensure that user information (such as payment information and user privacy information) will not be tampered with, passwords will not be hijacked, and fingerprints or faces and other information will not be stolen.

The first trusted application may be a pre-designated trusted application that may be used to perform data verification processing on data in the blockchain, such as a financial payment application, an instant messaging application, or a pre-developed application. The first trusted application may be an application that needs to be installed in the terminal device, or a code program that is embedded in a hardware device of the terminal device in advance, or an application running in the backend of an operating system arranged in the terminal device in the form of a plug-in, or the like, which may be set specifically according to actual conditions. The verification rule may be a rule that can verify the authenticity of certain data. There may be multiple types of verification rules, for example, a verification rule set based on time (such as a rule for verifying whether time of a certain one or more pieces of data to be verified matches that in the benchmark circulation data), a verification rule set based on one or more pieces of designated information (such as a rule for verifying whether one or more pieces of designated information in the data to be verified matches the benchmark circulation data), or a verification rule set based on a data verification rule for the target service in the blockchain. Different verification rules may be set for the data to be verified of different service categories. For example, a verification rule of meeting real-name authentication requirements may be set for a real-name authentication service, a verification rule of meeting payment time and payment amount requirements may be set for a payment service, and so on, which may be set specifically according to actual situations. Moreover, the verification rule is pre-set in the TEE of the terminal device. In order to ensure the safety of the verification rule, the verification rule may be ciphertext. That is, content of the verification rule may be formulated by an authorized rule maker, and then the verification rule may be encrypted or signed with a designated encryption or signature method to form the ciphertext of the verification rule. The ciphertext of the verification rule is then transferred to the TEE of the terminal device through a designated secure data transmission channel, thereby ensuring the security of the verification rule and preventing tampering. In a feasible execution environment of the TEE, decryption or signature verification may be performed on the ciphertext of the verification rule. After confirming that the verification rule has not been tampered with (for example, signature verification is passed, or decryption may be performed and the decrypted verification rule meet a preset condition, or the like), the verification rule may be stored in the TEE.

In an embodiment, in order to ensure the security of the data to be verified and the benchmark circulation data and to prevent the data to be verified and the benchmark circulation data from being acquired by any application in the REE, a trusted application (that is, the first trusted application) may be arranged to perform data verification processing. Temporary protection on the data to be verified and the benchmark circulation data may be achieved through the first trusted application. For example, other unauthorized applications may be prevented from accessing the data to be verified and the benchmark circulation data, thus achieving data protection. In an embodiment, predetermined processing may be performed on the data to be verified and the benchmark circulation data to obtain data to be verified and benchmark circulation data that are processed, thus achieving data protection. For example, the data to be verified and the benchmark circulation data are encrypted or signed to obtain data to be verified and benchmark circulation data that are encrypted or signed. After the data to be verified in the blockchain and the benchmark circulation data generated during the execution of the target service in the third-party authority are acquired, the terminal device may start a trusted application (i.e., the first trusted application) for performing data verification processing. The first trusted application may be pre-configured with a security interface, and accordingly, the TEE of the terminal device may also be provided with a corresponding security interface. By means of the security interfaces between the first trusted application and the TEE, a secure data transmission channel may be established between the first trusted application and the TEE. The first trusted application may transmit the data to be verified and the benchmark circulation data to the TEE of the terminal device through the above security interfaces and data transmission channel. By setting the first trusted application, the security interfaces, and the data transmission channel, the security of data during verification can be ensured.

In an embodiment, there may also be multiple types of first trusted applications. A corresponding first trusted application may be set according to a service type, a service identifier, or the like corresponding to the data to be verified and the benchmark circulation data. A corresponding first trusted application may also be set according to data content, data type, or the like of the data to be verified and the benchmark circulation data. A corresponding first trusted application may also be set according to a different user corresponding to the data to be verified. Based on the above situations, in addition to acquiring the data to be verified of the target service from the blockchain, related information including a service type, a service identifier, a data type, a user, or the like may also be acquired. In practical applications, how to set the first trusted application may be set according to actual conditions, which is not limited in the embodiment of the present specification.

In step S108, whether the data to be verified meets the verification rule is determined by using the trusted execution environment of the TEE and based on the circulation data in the data to be verified and the benchmark circulation data, and a verification result of the data to be verified is output.

In an embodiment, in order to ensure that the data to be verified and the benchmark circulation data are not leaked, the data to be verified and the benchmark circulation data may be verified in the trusted execution environment of the TEE. There may be multiple types of specific data verification processes. An example processing method may include setting a verification rule in advance in order to verify the authenticity of the data to be verified and the benchmark circulation data. After the data to be verified and the benchmark circulation data are transmitted to the TEE of the terminal device, the data to be verified and the benchmark circulation data may be placed in the trusted execution environment of the TEE. In the trusted execution environment of the TEE, the terminal device may perform matching analysis on the circulation data in the data to be verified and the benchmark circulation data based on the verification rule, so as to determine whether the circulation data matches the benchmark circulation data. If it is determined through the verification rule that the two match each other, it is indicated that the data to be verified is true data. If it is determined through the verification rule that at least one information mismatch exists in the two types of data, it is indicated that the data to be verified is untrue data.

For example, if the target service is an online commodity transaction service, the verification rule includes a time-based matching rule, a payment amount matching rule, a logistics information matching rule, and the like. If the data to be verified has succeeded in the verification of the time-based matching rule, the verification of the payment amount matching rule, and the verification of the logistics information matching rule, it is indicated that the data to be verified is true data. If the data to be verified fails the verification of at least one verification rule among the time-based matching rule, the payment amount matching rule, and the logistics information matching rule, it is indicated that the data to be verified is untrue data.

If it is determined that the data to be verified is untrue data, a verification result of the data to be verified may be output as untrue, and if it is determined that the data to be verified is true data, a verification result of the data to be verified may be output as true. The output of the verification result of the data to be verified may be realized in a variety of manners. For example, the verification result of the data to be verified may be displayed, or the verification result of the data to be verified may be indicated by different indicators, which may be set according to actual situations and is not limited in the embodiments of the present specification.

The above data verification processing performed on the data to be verified is only an example processing method. Data verification may also be performed on the data to be verified through multiple other processing methods. Different processing methods may be used for performing data verification on the data to be verified according to different verification rules. Moreover, for different verification rules, the specific process of performing data verification on the data to be verified may vary, which may be set according to actual situations and not limited in the embodiments of the present specification.

Embodiments of the present specification provide a method for processing blockchain data, which is applied to a terminal device provided with a trusted execution environment TEE. For data to be verified of a target service recorded in a blockchain, the data to be verified including circulation data generated during execution of the target service is acquired from the blockchain, and benchmark circulation data generated during the execution of the target service in a relevant third-party authority for verifying authenticity of the data to be verified may be acquired based on the target service. Through a first trusted application for performing data verification processing on the terminal device, the data to be verified and the benchmark circulation data are transferred to the TEE of the terminal device, thereby ensuring the security of the data to be verified and the benchmark circulation data in the process of transmitting to the TEE. In addition, a verification rule set in the trusted execution environment of the TEE is used to perform data verification on the data to be verified in the trusted execution environment of the TEE. Since TEE is a security operating environment for data processing, the security of the data to be verified and the benchmark circulation data in the process of being processed in the terminal device can be ensured, thus preventing the data to be verified and the benchmark circulation data from being tampered with, improving the security of the data to be verified in the verification process, and ensuring the accuracy and reliability of the verification result.

Figure 3:
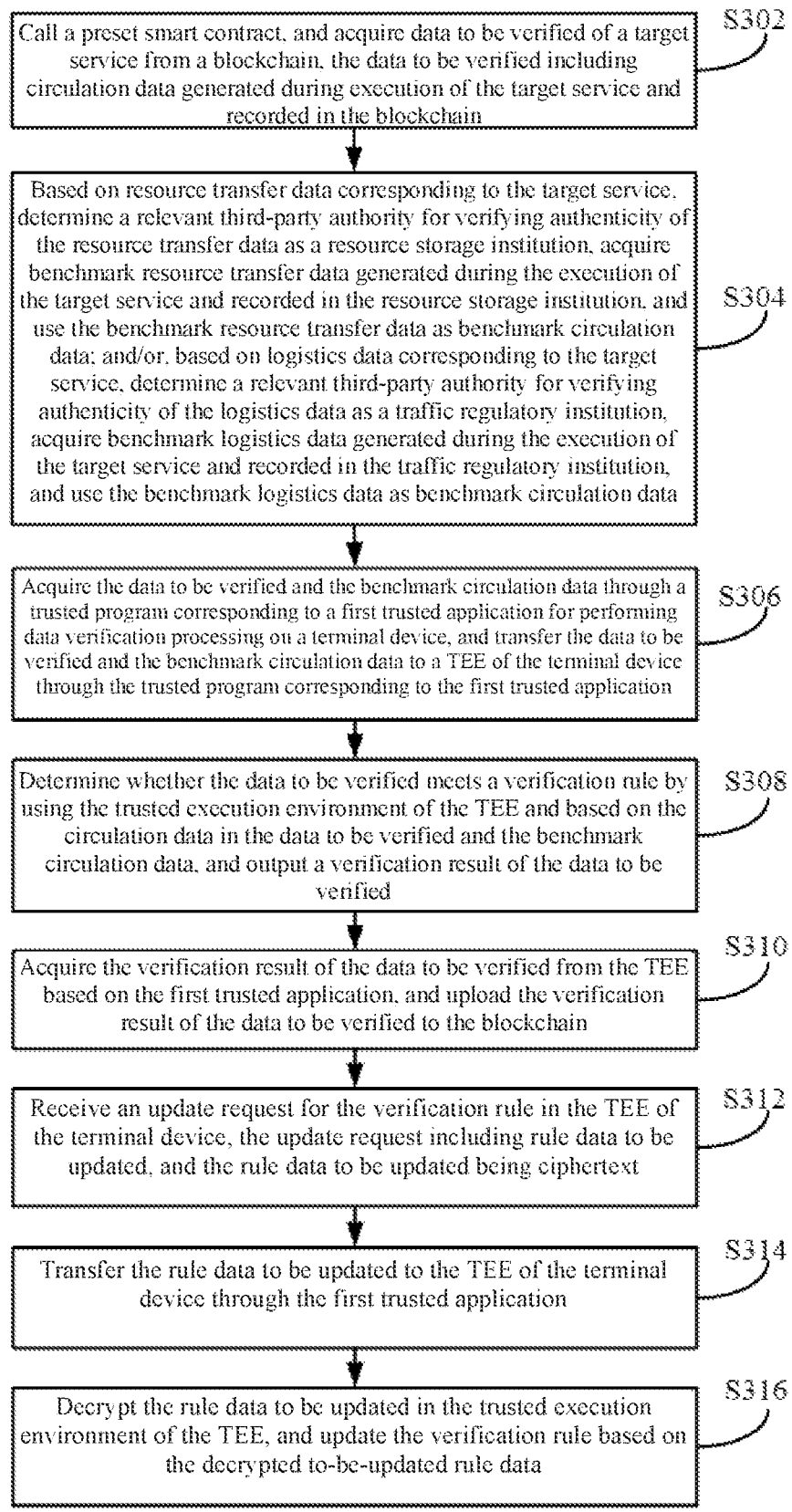
FIG. 3 is a flowchart of a method for processing blockchain data according to an embodiment.

FIG. 3 is a flowchart of a method for processing blockchain data according to an embodiment. In the embodiment, an online transaction service is used as an example for description. The method may be performed a terminal device, wherein the terminal device may be a computer device such as a laptop computer or a desktop computer. The terminal device may be a terminal device for performing trust verification on data to be uploaded to a blockchain. The terminal device may be provided with a trusted execution environment. The trusted execution environment may be a TEE, may be implemented by a program written in a predetermined programming language, and may be a safe operation environment for data processing. The method may also be performed by a server and the like, and the server may also be provided with the above trusted execution environment TEE. The present embodiment of the present specification takes the method being performed by a terminal device as an example for description. The method may include the following steps.

In step S302, a preset smart contract is called, and data to be verified of a target service is acquired from a blockchain, the data to be verified including circulation data generated during execution of the target service and recorded in the blockchain.

The smart contract may be a computer protocol designed for propagation, verification, or execution of a contract in an informationized manner. The smart contract allows trusted service processing without a third party, and the trusted service processing is traceable and irreversible. The smart contract includes a protocol on which contract participants may execute rights and obligations agreed by the contract participants. The smart contract may include a trigger condition that triggers execution of the smart contract and a result corresponding to the trigger condition. The smart contract may include one or more trigger conditions, and each trigger condition may correspond to a result. The data to be verified may include resource transfer data corresponding to the target service and/or logistics data corresponding to the target service. The resource transfer data may be related data for transferring a possession right of a certain resource value from one user to another user, such as payment-related data. The logistics data may be related data of a route of an item or a commodity transferred from a certain place to a designated destination.

In an embodiment, in order to acquire certain data from the blockchain, a smart contract may be generated in advance, and the smart contract may be deployed in the blockchain. When the terminal device needs to acquire the data to be verified of the target service in the blockchain, the smart contract may be called. Based on the smart contract, the data to be verified of the target service may be acquired from the blockchain. For a detailed processing process, reference may be made to the above related content.

In an embodiment, the smart contract may be called through a first application in the terminal device, and based on the smart contract, the data to be verified of the target service may be acquired from the blockchain. The details may be set according to actual situations, which will not be limited in the embodiments of the present specification.

In view of a situation where the data to be verified includes the resource transfer data corresponding to the target service and/or the logistics data corresponding to the target service, step S104 in FIG. 1 may also be implemented by the following step S304.

In step S304, based on the resource transfer data corresponding to the target service, a relevant third-party authority for verifying authenticity of the resource transfer data is determined as a resource storage institution, benchmark resource transfer data generated during the execution of the target service and recorded in the resource storage institution is acquired, and the benchmark resource transfer data is used as the benchmark circulation data; and/or, based on the logistics data corresponding to the target service, a relevant third-party authority for verifying authenticity of the logistics data is determined as a traffic regulatory institution, benchmark logistics data generated during the execution of the target service and recorded in the traffic regulatory institution is acquired, and the benchmark logistics data is used as the benchmark circulation data.

The resource storage institution may be a third-party authority that provides resource transfer processing, and may transfer the resource possession right of a predetermined resource value of a certain user to another user. For example, it may be a financial institution (such as a bank or a financial organization or company). The traffic regulatory institution may be an organization or institution that supervises traffic conditions, such as the Ministry of Transport of a country or the traffic department of a city.

In an embodiment, where the data to be verified includes the resource transfer data corresponding to the target service, after the terminal device acquires the data to be verified, the data to be verified may be analyzed to acquire the resource transfer data corresponding to the target service therefrom. The resource transfer data may be analyzed to determine a resource storage institution involved in the resource transfer processing, and the obtained resource storage institution may be used as a relevant third-party authority for verifying the authenticity of the resource transfer data. Then, the resource transfer data generated during the execution of the target service may be acquired from a database or server corresponding to the resource storage institution, and the acquired resource transfer data may be used as the benchmark resource transfer data. Benchmark circulation data may be constructed through the benchmark resource transfer data.

In an embodiment, where the data to be verified includes logistics data corresponding to the target service, after the terminal device acquires the data to be verified, the data to be verified may be analyzed to acquire the logistics data corresponding to the target service therefrom. The logistics data may be analyzed to determine a traffic regulatory institution involved in the transmission of a corresponding item or commodity, and the above obtained traffic regulatory institution may be used as a relevant third-party authority for verifying the authenticity of the resource transfer data. Then, the logistics data generated during the execution of the target service may be acquired from a database or server corresponding to the traffic regulatory institution, and the acquired logistics data may be used as the benchmark logistics data. Benchmark circulation data may be constructed through the benchmark logistics data.

In an embodiment, the resource transfer data may further include a resource transfer value and/or a resource transfer time, and the logistics data may include information about a logistics path and/or a time for passing through a predetermined node in the logistics path.

The logistics path may be a path taken by an item or commodity from a certain starting point to a designated destination point. The predetermined node may be a designated place passed on the path from the starting point to the designated destination point, and so on.

In step S306, the data to be verified and the benchmark circulation data are acquired through a trusted program corresponding to a first trusted application for performing data verification processing on the terminal device, and the data to be verified and the benchmark circulation data are transferred to the TEE of the terminal device through the trusted program corresponding to the first trusted application.

The verification rule may be set based on one or more of the following: a data verification rule for the target service in the blockchain; a time condition of data generation in the blockchain; and an identity verification rule for a user uploading data in the blockchain. The data verification rule for the target service in the blockchain may, for example, make the verification rule to correspond to a service that the blockchain is oriented toward, and corresponding verification rules may be set based on different services that the blockchain is oriented toward. For example, the target service in the blockchain is a public welfare service, a data verification rule based on time matching and payment amount matching may be set. That is, time information, payment amount information, and the like contained in the data to be verified and the benchmark circulation data may be extracted, and then the time information, payment amount information, and the like contained in the data to be verified and the benchmark circulation data are compared and processed separately. Other methods can be also set based on actual situations, which is not limited in the embodiment of the present specification. The time condition of data generation in the blockchain may be, for example, the time or time period condition for uploading the data to be verified to the blockchain. If the data to be verified is uploaded to the blockchain within the time or time period, it may be determined that the data to be verified is true; otherwise, it may be determined that the data to be verified is not true, and so on. In an embodiment, the verification rule may be set directly through the time condition of data generation in the blockchain, and the verification rule may also be set by combining the time condition of data generation in the blockchain with another rule (such as a service verification rule and an identity verification rule). The identity verification rule for a user uploading data in the blockchain may be a rule based on the identity of a user who has the permission to upload data to the blockchain. For example, users who have the permission to upload data to the blockchain include only user A and user B, and if the data to be verified is data provided by a user other than the above two users, it may be determined that the data to be verified is not true.

In an embodiment, the verification rule may also be set based on multiple ones of the above items. Moreover, in addition to setting the verification rule through the above methods, the verification rule may also be set in a variety of ways. For example, the verification rule may be set flexibly based on requirements of the user, requirements of a service corresponding to the blockchain, requirements of a blockchain manager or a blockchain builder, and the like.

The trusted program corresponding to the first trusted application may be an application built based on a trusted program in the TEE of the terminal device. The TEE also provides a safe execution environment for an authorized security application (or referred to as a trusted program, i.e., TrustApp (TA)), and at the same time, also protects the confidentiality, integrity, and access permission of resources and data of the trusted program. Different trusted programs can be ensured to be isolated from each other by using cryptography, and any trusted program may not arbitrarily read and operate data of other trusted programs. Therefore, in addition to the TEE and the REE being independent of each other in the terminal device, each trusted program in the TEE may also need authorization and runs independently of one another. In addition, the integrity of the trusted program needs to be validated before execution to ensure that the trusted program is not tampered with. The trusted program may directly interact with peripherals such as a touch screen, a camera, and a fingerprint sensor, without the need to provide an interface through the REE of the terminal device, thereby ensuring data security. The trusted application may include a client program and a trusted terminal program. The client program may be a trusted program corresponding to the first trusted application. The trusted terminal program may be a corresponding trusted program in the TEE. The trusted program corresponding to the first trusted application may trigger the corresponding trusted program in the TEE to run, so that the trusted program corresponding to the first trusted application and the corresponding trusted program in the TEE can perform safe data transfer between each other.

In an embodiment, in order to ensure the safety and accuracy of the data to be verified and the benchmark circulation data, the data to be verified and the benchmark circulation data may be acquired through the trusted program corresponding to the first trusted application for performing data verification processing on the terminal device, to further ensure the security of the data to be verified and the benchmark circulation data. In addition, the trusted program corresponding to the first trusted application may also be used to trigger the running of a corresponding trusted program in the TEE. Then, a secure data transmission channel is established between the trusted program corresponding to the first trusted application and the corresponding trusted program in the TEE. Through the established data transmission channel, the trusted program corresponding to the first trusted application may transfer the data to be verified and the benchmark circulation data to the corresponding trusted program in the TEE of the terminal device, so that the data to be verified and the benchmark circulation data can safely arrive in the TEE of the terminal device.

In addition, in order to further ensure the security of the data to be verified and the benchmark circulation data, the data to be verified and the benchmark circulation data may also be transferred to the TEE of the terminal device in a ciphertext manner. For example, the first trusted application used for performing data verification processing on the terminal device transfers the data to be verified and the benchmark circulation data to the TEE of the terminal device in a ciphertext manner.

In an embodiment, in order to ensure the security of the data to be verified and the benchmark circulation data in the data verification process, the data to be verified and the benchmark circulation data may be encrypted. There may be multiple types of encryption algorithms, such as a symmetric encryption algorithm or an asymmetric encryption algorithm. The first trusted application may perform encryption processing on the data to be verified and the benchmark circulation data respectively by using the above symmetric encryption algorithm or asymmetric encryption algorithm to obtain the data to be verified and benchmark circulation data that are encrypted (in this case, the data to be verified is ciphertext, and the benchmark circulation data is also ciphertext). Then, the first trusted application may transfer the data to be verified and benchmark circulation data that are encrypted to the TEE of the terminal device through a corresponding interface and data transmission channel, so as to ensure the security of the data to be verified and the benchmark circulation data in the data verification process.

In the case where the data to be verified and the benchmark circulation data have been encrypted, there may be no need to encrypt the data to be verified and the benchmark circulation data, or the data to be verified and benchmark circulation data may also be re-encrypted, which may be set according to actual situations.

For the data to be verified and benchmark circulation data that are encrypted, the following processing may be performed: in the trusted execution environment of the TEE, the data to be verified is decrypted separately to obtain the decrypted to-be-verified data, and in the trusted execution environment of the TEE, the benchmark circulation data is decrypted to obtain the decrypted benchmark circulation data.

In step S308, whether the data to be verified meets the verification rule is determined by using the trusted execution environment of the TEE and based on the circulation data in the data to be verified and the benchmark circulation data, and a verification result of the data to be verified is output.

In an embodiment, one of the data to be verified and the benchmark circulation data may also be encrypted. If the data to be verified is encrypted data, step S308 may include: in the trusted execution environment of the TEE, the data to be verified is decrypted to obtain decrypted to-be-verified data; and in the trusted execution environment of the TEE, based on the circulation data in the decrypted to-be-verified data and the benchmark circulation data, it is determined whether the decrypted to-be-verified data meets the verification rule. If the benchmark circulation data is encrypted data, step S308 may include: in the trusted execution environment of the TEE, the benchmark circulation data is decrypted to obtain decrypted benchmark circulation data; and in the trusted execution environment of the TEE, based on the above circulation data and the decrypted benchmark circulation data, it is determined whether the data to be verified meets the verification rule.

In an embodiment, the resource transfer data includes a resource transfer value and/or a resource transfer time, and the logistics data includes information of a logistics path and/or a time for passing through a predetermined node in the logistics path. Accordingly, step S308 may include: in the trusted execution environment of TEE, according to the verification rule, the resource transfer value in the data to be verified may be matched with the resource transfer value in the benchmark circulation data, and/or the resource transfer time in the data to be verified may be matched with the resource transfer time in the benchmark circulation data, and the information of the logistics path in the data to be verified may be matched with the information of the logistics path in the benchmark circulation data, and/or the time for passing through a predetermined node in the logistics path in the data to be verified may be matched with the time for passing through a predetermined node in the logistics path in the benchmark circulation data, and it may be determined, through matching results, whether the data to be verified meets the verification rule, and a verification result of the data to be verified is output.

In addition, there may be a variety of processing methods of determining whether the data to be verified meets the verification rule by using the trusted execution environment of the TEE and based on the circulation data in the data to be verified and the benchmark circulation data. An example processing method may include the following steps A2 to A6.

In step A2, in the trusted execution environment of the TEE, the data to be verified and the benchmark circulation data are respectively decrypted to obtain decrypted to-be-verified data and decrypted benchmark circulation data.

In step A4, the decrypted to-be-verified data and the decrypted benchmark circulation data are processed respectively in the trusted execution environment of the TEE based on the verification rule to obtain first sub-data to be verified contained in the decrypted to-be-verified data and corresponding second sub-data to be verified contained in the decrypted benchmark circulation data In an embodiment, in the trusted execution environment of TEE, the decrypted to-be-verified data may be processed through the verification rule. For example, a project data extraction algorithm corresponding to the verification rule may be acquired, and the decrypted to-be-verified data is processed using the project data extraction algorithm to process an item contained in the decrypted to-be-verified data and content data corresponding to the item, to obtain data of one or more items contained in the decrypted to-be-verified data. The obtained data of the one or more items may be used as the first sub-data to be verified. At the same time, the decrypted benchmark circulation data may be processed by using the project data extraction algorithm to obtain data of one or more items contained in the decrypted benchmark circulation data, and the obtained data of the one or more items may be used as the second sub-data to be verified.

There may be multiple types of project data extraction algorithms, which may be set according to actual conditions and are not limited in the embodiment of the present specification.

In step A6, in the trusted execution environment of the TEE, the first sub-data to be verified and the corresponding second sub-data to be verified are respectively matched, and it is determined, based on the matching results, whether the data to be verified meets the verification rule.

In an embodiment, in the trusted execution environment of the TEE, the first sub-data to be verified and the corresponding second sub-data to be verified are matched respectively to compare data of an item corresponding to the first sub-data to be verified with the data of an item corresponding to the corresponding second sub-data to be verified. If the first sub-data to be verified matches the corresponding second sub-data to be verified, it may be determined that the data to be verified meets the verification rule; otherwise, it may be determined that the data to be verified does not meet the verification rule.

In step S310, the verification result of the data to be verified is acquired from the TEE based on the first trusted application, and the verification result of the data to be verified is uploaded to the blockchain.

In an embodiment, in order to deposit the verification result, the verification result of the data to be verified may be acquired from the TEE through the first trusted application, and the verification result of the data to be verified may be uploaded to the blockchain.

In order to verify the authenticity of the data to be verified more flexibly, the data verification rule that has been set may also be modified, as described in steps S312 to S316.

In step S312, an update request for the verification rule in the TEE of the terminal device is received, the update request including rule data to be updated, and the rule data to be updated being ciphertext.

In an embodiment, the verification rule may include a variety of different content. A model configured to perform data verification on the data to be verified may also be provided in the trusted execution environment of the TEE according to an actual situation, such as a classification model. The model may be obtained through a complex program written in a predetermined programming language, or through a simple algorithm, which is not limited in the embodiment of the present specification. In addition, in order to prevent irrelevant users from updating the verification rule, relevant information of a user having an update permission (such as a user initially setting or creating the verification rule or a pre-specified user) may also be set for the verification rule, that is, only a user having an update permission can update the verification rule. When a verification rule in the TEE needs to be updated, the user may input an identifier of the verification rule to be modified and to-be-updated rule data through the first trusted application (or the trusted program corresponding to the first trusted application) in the terminal device. Upon completion of the input, the terminal device may acquire the identifier of the verification rule needing to be modified and to-be-updated rule data that are input, and may generate an update request, so that the terminal device may acquire an update request for the data verification rule.

In an embodiment, the rule data to be updated may be a model or algorithm in the verification rule or the type of service to which the verification rule applies, which may be set according to actual situations and is not limited in the embodiment of the present specification.

In step S314, the rule data to be updated is transferred to the TEE of the terminal device through the first trusted application.

In step S316, the rule data to be updated is decrypted in the trusted execution environment of the TEE, and the verification rule is updated based on the decrypted to-be-updated rule data.

In an embodiment, the terminal device, after acquiring the update request for the verification rule, may acquire an identifier of the verification rule included in the update request, and may find the corresponding verification rule through the identifier. The information of the user having a permission to update the verification rule may be acquired. It is searched for, from the information of the user having an update permission, whether information of a user initiating a current update request is included. If information of a user initiating a current update request is included, it may be determined that the user initiating the current update request has a permission to update the verification rule. In this case, the terminal device may update the verification rule in the trusted execution environment of the TEE based on the above update request to obtain an updated verification rule. If information of a user initiating a current update request is not included, it may be determined that the user initiating the current update request does not have any permission to update the verification rule. In this case, the terminal device may send a notification message indicative of failure of the updating to the user initiating the current update request.

In some embodiments, steps S312 to S316 may be performed after the steps S302 to S310. In some embodiments, steps S312 to S316 may also be performed before steps S302 to step S310, which is not limited in the embodiment of the present specification.

In the above embodiments, after the updated verification rule is obtained, the updated verification rule may be subsequently used to perform data verification on the data to be verified. For the detailed processing, reference can be made to the above related content.

Embodiments of the present specification provide a method for processing blockchain data, which is applied to a terminal device provided with a trusted execution environment TEE. For data to be verified of a target service recorded in a blockchain, the data to be verified including circulation data generated during execution of the target service is acquired from the blockchain, and benchmark circulation data generated during the execution of the target service in a relevant third-party authority for verifying authenticity of the data to be verified may be acquired based on the target service. Through a first trusted application for performing data verification processing on the terminal device, the data to be verified and the benchmark circulation data are transferred to the TEE of the terminal device, thereby ensuring the security of the data to be verified and the benchmark circulation data in the process of transmitting to the TEE. In addition, a verification rule set in the trusted execution environment of the TEE is used to perform data verification on the data to be verified in the trusted execution environment of the TEE. Since TEE is a security operating environment for data processing, the security of the data to be verified and the benchmark circulation data in the process of being processed in the terminal device can be ensured, thus preventing the data to be verified and the benchmark circulation data from being tampered with, improving the security of the data to be verified in the verification process, and ensuring the accuracy and reliability of the verification result. In addition, for the resource transfer data and/or logistics data in the online transaction service, the authenticity of the data to be verified is verified, which further ensures the accuracy and reliability of the verification result.

Figure 4:
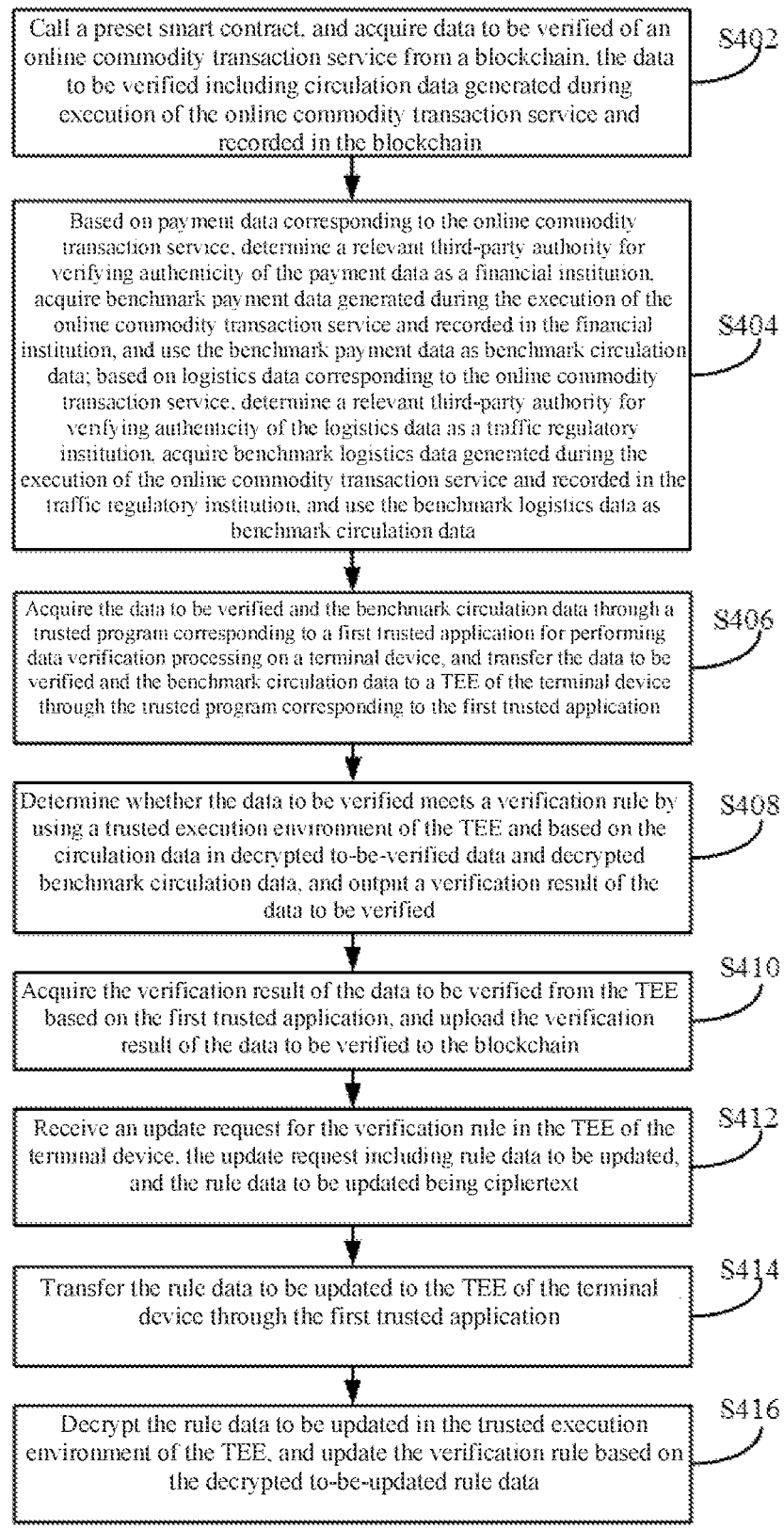
FIG. 4 is a flowchart of a method for processing blockchain data according to an embodiment.

FIG. 4 is a flowchart of a method for processing blockchain data according to embodiment. In the embodiment, the target service being an online commodity transaction service is used as an example for illustration. The resource transfer data may be payment data, and the resource transfer institution may be a financial institution. The resource transfer value may be a payment value, and the resource transfer time may be a payment time. The method may be a terminal device, wherein the terminal device may be a computer device such as a laptop computer or a desktop computer. The terminal device may be a terminal device for performing trust verification on data to be uploaded to a blockchain. The terminal device may be provided with a trusted execution environment. The trusted execution environment may be a TEE, may be implemented by a program written in a predetermined programming language, and may be a safe operation environment for data processing. The method may also be performed by a server and the like, and the server may also be provided with the above trusted execution environment TEE. The present embodiment of the present specification takes the method being performed by a terminal device as an example for description. The method may include the following steps.

In step S402, a preset smart contract is called, and data to be verified of an online commodity transaction service is acquired from a blockchain, the data to be verified including circulation data generated during execution of the online commodity transaction service and recorded in the blockchain.

The data to be verified may include payment data corresponding to the online commodity transaction service and logistics data corresponding to the online commodity transaction service.

In step S404, based on the payment data corresponding to the online commodity transaction service, a relevant third-party authority for verifying authenticity of the payment data is determined as a financial institution, benchmark payment data generated during execution of the online commodity transaction service and recorded in the financial institution is acquired, and the benchmark payment data is used as benchmark circulation data; based on the logistics data corresponding to the online commodity transaction service, a relevant third-party authority for verifying authenticity of the logistics data is determined as a traffic regulatory institution, benchmark logistics data generated during the execution of the online commodity transaction service and recorded in the traffic regulatory institution is acquired, and the benchmark logistics data is used as benchmark circulation data.

In an embodiment, the payment data may further include a payment value and/or a payment time, and the logistics data may include information about a logistics path and/or a time for passing through a predetermined node in the logistics path.

In step S406, the data to be verified and the benchmark circulation data are acquired through a trusted program corresponding to a first trusted application for performing data verification processing on the terminal device, and the data to be verified and the benchmark circulation data are transferred to the TEE of the terminal device through the trusted program corresponding to the first trusted application.

In an embodiment, in order to ensure the security of data during the data verification, the data to be verified and the benchmark circulation data may be encrypted in advance, that is, the data to be verified and the benchmark circulation data may both be ciphertext, and may also be transferred to the TEE of the terminal device in a ciphertext manner. For example, the first trusted application used for performing data verification processing on the terminal device transfers the data to be verified and the benchmark circulation data to the TEE of the terminal device in a ciphertext manner.

In an embodiment, where the above data to be verified and the benchmark circulation data have been encrypted, there may be no need to encrypt the data to be verified and the benchmark circulation data, or the data to be verified and benchmark circulation data may also be re-encrypted, which may be set according to actual situations.

For the data to be verified and benchmark circulation data that are encrypted, the following processing may be performed: in the trusted execution environment of the TEE, the data to be verified is decrypted separately to obtain the decrypted to-be-verified data, and in the trusted execution environment of the TEE, the benchmark circulation data is decrypted to obtain the decrypted benchmark circulation data.

In step S408, whether the data to be verified meets a verification rule is determined by using the trusted execution environment of the TEE and based on the circulation data in the decrypted to-be-verified data and the decrypted benchmark circulation data, and a verification result of the data to be verified is output.

There may be a variety of types of processing methods for determining whether the data to be verified meets the verification rule by using the trusted execution environment of the TEE and based on the circulation data in the data to be verified and the benchmark circulation data. An example processing method may include: in the trusted execution environment of the TEE, respectively decrypting the data to be verified and the benchmark circulation data to obtain decrypted to-be-verified data and decrypted benchmark circulation data; in the trusted execution environment of the TEE, processing the decrypted to-be-verified data and the decrypted benchmark circulation data respectively based on the verification rule to obtain first sub-data to be verified contained in the decrypted to-be-verified data and corresponding second sub-data to be verified contained in the decrypted benchmark circulation data; and in the trusted execution environment of the TEE, matching the first sub-data to be verified and the corresponding second sub-data to be verified respectively, and determining, based on matching results, whether the data to be verified meets the verification rule.

In step S410, the verification result of the data to be verified is acquired from the TEE based on the first trusted application, and the verification result of the data to be verified is uploaded to the blockchain.

In order to verify the authenticity of the data to be verified more flexibly, the data verification rule that has been set may also be modified, as described in steps S412 to S416.

In step S412, an update request for the verification rule in the TEE of the terminal device is received, the update request including rule data to be updated, and the rule data to be updated being ciphertext.

In step S414, the rule data to be updated is transferred to the TEE of the terminal device through the first trusted application.

In step S416, the rule data to be updated is decrypted in the trusted execution environment of the TEE, and the verification rule is updated based on the decrypted to-be-updated rule data.

Embodiments of the present specification provide a method for processing blockchain data, which is applied to a terminal device provided with a trusted execution environment TEE. For data to be verified of a target service recorded in a blockchain, the data to be verified including circulation data generated during execution of the target service is acquired from the blockchain, and benchmark circulation data generated during the execution of the target service in a relevant third-party authority for verifying authenticity of the data to be verified may be acquired based on the target service. Through a first trusted application for performing data verification processing on the terminal device, the data to be verified and the benchmark circulation data are transferred to the TEE of the terminal device, thereby ensuring the security of the data to be verified and the benchmark circulation data in the process of transmitting to the TEE. In addition, a verification rule set in the trusted execution environment of the TEE is used to perform data verification on the data to be verified in the trusted execution environment of the TEE. Since TEE is a security operating environment for data processing, the security of the data to be verified and the benchmark circulation data in the process of being processed in the terminal device can be ensured, thus preventing the data to be verified and the benchmark circulation data from being tampered with, improving the security of the data to be verified in the verification process, and ensuring the accuracy and reliability of the verification result. In addition, for the resource transfer data and/or logistics data in the online transaction service, the authenticity of the data to be verified is verified, which further ensures the accuracy and reliability of the verification result.

Figure 5:
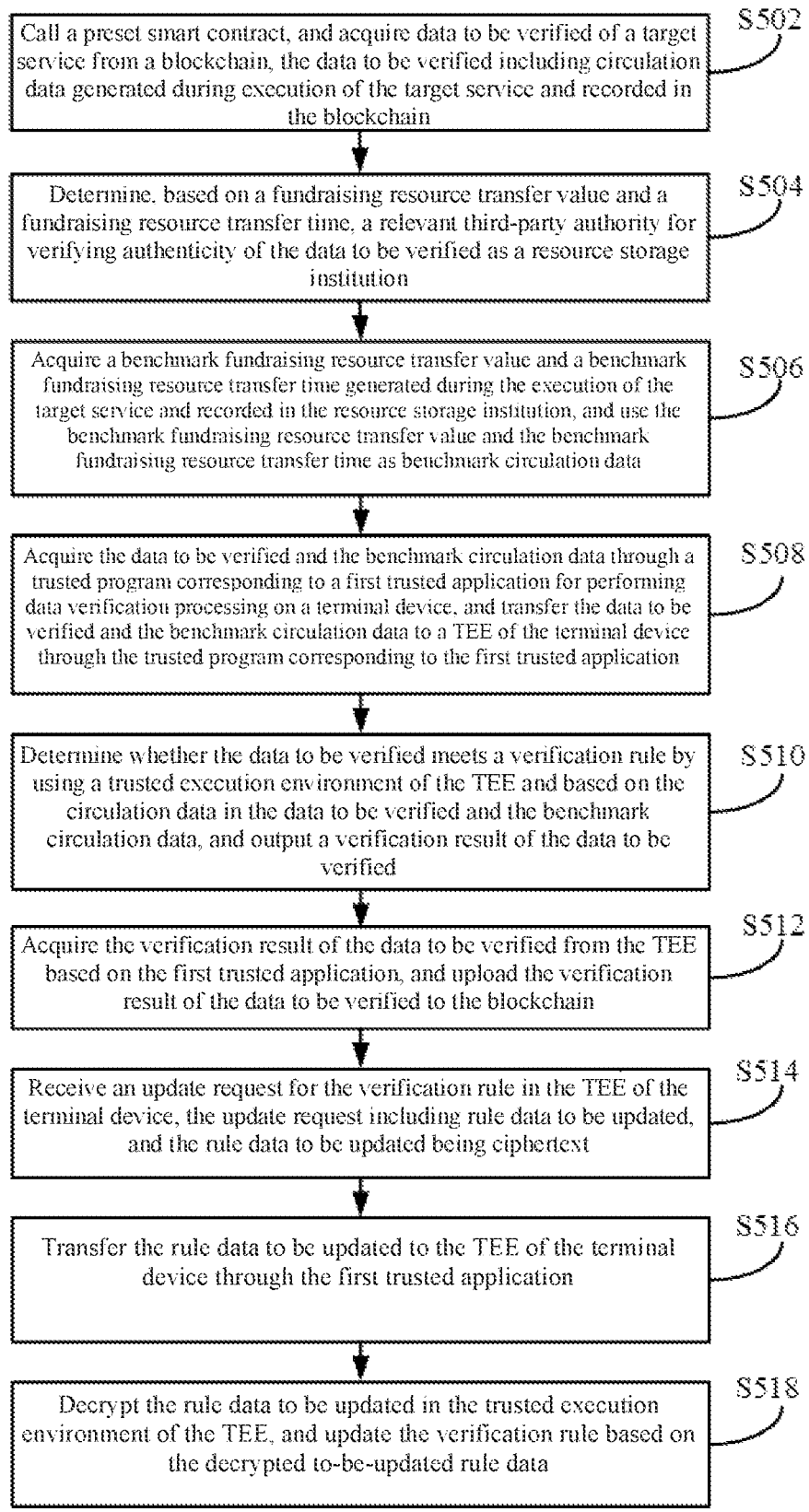
FIG. 5 is a flowchart of a method for processing blockchain data according to an embodiment.

FIG. 5 is flowchart of a method for processing blockchain data according to embodiment. In the embodiment, a fundraising service and a charity service are used as an example for description. The method may be performed by a terminal device, wherein the terminal device may be a computer device such as a laptop computer or a desktop computer. The terminal device may be a terminal device for performing trust verification on data to be uploaded to a blockchain. The terminal device may be provided with a trusted execution environment. The trusted execution environment may be a TEE, may be implemented by a program written in a predetermined programming language, and may be a safe operation environment for data processing. The method may also be performed by a server and the like, and the server may also be provided with the above trusted execution environment TEE. The present embodiment of the present specification takes the method being performed by a terminal device as an example for description. The method may include the following steps.

In step S502, a preset smart contract is called, and data to be verified of a target service is acquired from a blockchain, the data to be verified including circulation data generated during execution of the target service and recorded in the blockchain.

The data to be verified may include a fundraising resource transfer value and a fundraising resource transfer time. The fundraising resource transfer value may be a resource value provided by a fundraiser to a donor, and the fundraising resource transfer time may be the time when the possession permission of the resource value provided by the fundraiser is transferred to the donor.

Step S502 may be triggered in a variety of methods. For example, the fundraiser may send a query request for the circulation of resources provided by the fundraiser to the terminal device through a terminal device thereof, and the terminal device, after receiving the query request, may call a preset smart contract through the first trusted application to acquire the data to be verified of the target service from the blockchain. The data to be verified includes the circulation data generated during the execution of the target service and recorded in the blockchain. In an embodiment, a query period for the circulation of resources provided by the fundraiser may also be set in the terminal device, and each time the query period is reached, the terminal device may trigger the execution of step S502.

In step S504, based on the fundraising resource transfer value and the fundraising resource transfer time, a relevant third-party authority for verifying authenticity of the data to be verified is determined as a resource storage institution.

The resource storage institution may be an organization or institution used to store the resources provided by the fundraiser, such as a banking institution or a public welfare fund organization.

In step S506, a benchmark fundraising resource transfer value and a benchmark fundraising resource transfer time generated during the execution of the target service and recorded in the resource storage institution are acquired, and the benchmark fundraising resource transfer value and the benchmark fundraising resource transfer time are used as the benchmark circulation data.

In step S508, the data to be verified and the benchmark circulation data are acquired through a trusted program corresponding to a first trusted application for performing data verification processing on the terminal device, and the data to be verified and the benchmark circulation data are transferred to the TEE of the terminal device through the trusted program corresponding to the first trusted application.

In addition, in order to further ensure the security of the data to be verified and the benchmark circulation data, the data to be verified and the benchmark circulation data may also be transferred to the TEE of the terminal device in a ciphertext manner. For example, the first trusted application used for performing data verification processing on the terminal device transfers the data to be verified and the benchmark circulation data to the TEE of the terminal device in a ciphertext manner.

In an embodiment, where the data to be verified and the benchmark circulation data have been encrypted, there may be no need to encrypt the data to be verified and the benchmark circulation data, or the data to be verified and benchmark circulation data may also be re-encrypted, which may be set according to actual situations.

For the data to be verified and benchmark circulation data that are encrypted, the following processing may be performed: in the trusted execution environment of the TEE, the data to be verified is decrypted separately to obtain the decrypted to-be-verified data, and in the trusted execution environment of the TEE, the benchmark circulation data is decrypted to obtain the decrypted benchmark circulation data.

In step S510, whether the data to be verified meets the verification rule is determined by using the trusted execution environment of the TEE and based on the circulation data in the data to be verified and the benchmark circulation data, and a verification result of the data to be verified is output.

There may be a variety of types of processing methods for determining whether the data to be verified meets the verification rule by using the trusted execution environment of the TEE and based on the circulation data in the data to be verified and the benchmark circulation data. An example processing method may include: in the trusted execution environment of the TEE, respectively decrypting the data to be verified and the benchmark circulation data to obtain decrypted to-be-verified data and decrypted benchmark circulation data; in the trusted execution environment of the TEE, processing the decrypted to-be-verified data and the decrypted benchmark circulation data respectively based on the verification rule to obtain first sub-data to be verified contained in the decrypted to-be-verified data and corresponding second sub-data to be verified contained in the decrypted benchmark circulation data; and in the trusted execution environment of the TEE, matching the first sub-data to be verified and the corresponding second sub-data to be verified respectively, and determining, based on matching results, whether the data to be verified meets the verification rule.

In step S512, the verification result of the data to be verified is acquired from the TEE based on the first trusted application, and the verification result of the data to be verified is uploaded to the blockchain.

In order to verify the authenticity of the data to be verified more flexibly, the data verification rule that has been set may also be modified, as described in steps S514 to S518.

In step S514, an update request for the verification rule in the TEE of the terminal device is received, the update request including rule data to be updated, and the rule data to be updated being ciphertext.

In step S516, the rule data to be updated is transferred to the TEE of the terminal device through the first trusted application.

In step S518, the rule data to be updated is decrypted in the trusted execution environment of the TEE, and the verification rule is updated based on the decrypted to-be-updated rule data.

In some embodiments, steps S514 to S518 may be performed after steps S502 to S512. In some embodiments, steps S514 to S518 may also be performed before steps S502 to step S512, which is not limited in the embodiment of the present specification.

In the above embodiments, after the modified data verification rule is obtained, the modified data verification rule may be subsequently used to verify authenticity of the data to be verified.

Embodiments of the present specification provide a method for processing blockchain data, which is applied to a terminal device provided with a trusted execution environment TEE. For data to be verified of a target service recorded in a blockchain, the data to be verified including circulation data generated during execution of the target service is acquired from the blockchain, and benchmark circulation data generated during the execution of the target service in a relevant third-party authority for verifying authenticity of the data to be verified may be acquired based on the target service. Through a first trusted application for performing data verification processing on the terminal device, the data to be verified and the benchmark circulation data are transferred to the TEE of the terminal device, thereby ensuring the security of the data to be verified and the benchmark circulation data in the process of transmitting to the TEE. In addition, a verification rule set in the trusted execution environment of the TEE is used to perform data verification on the data to be verified in the trusted execution environment of the TEE. Since TEE is a security operating environment for data processing, the security of the data to be verified and the benchmark circulation data in the process of being processed in the terminal device can be ensured, thus preventing the data to be verified and the benchmark circulation data from being tampered with, improving the security of the data to be verified in the verification process, and ensuring the accuracy and reliability of the verification result. In addition, the authenticity of the data to be verified is verified for the fundraising resource transfer value and the fundraising resource transfer time in the fundraising service or public welfare service, which further ensures the accuracy and reliability of the verification result.

Figure 6:
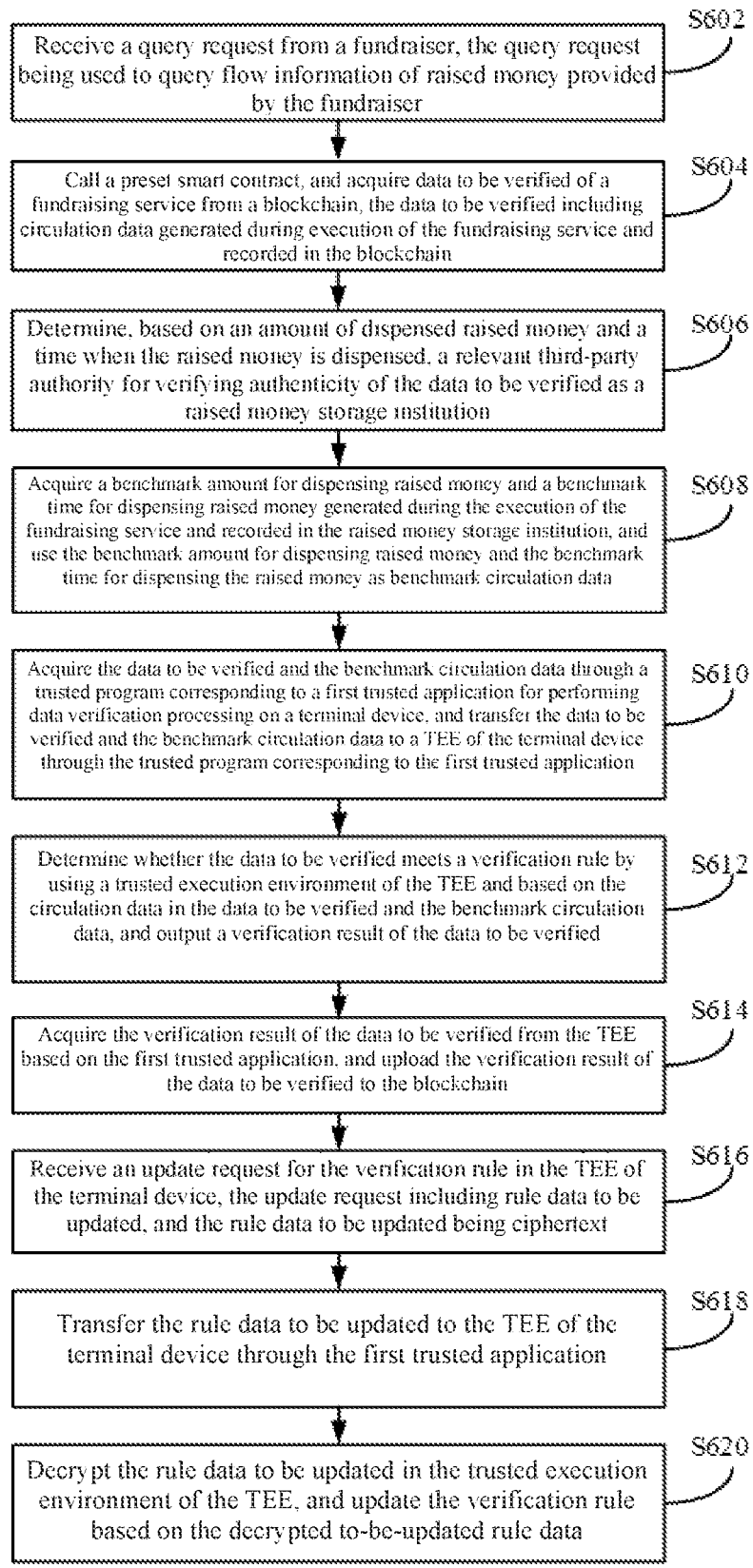
FIG. 6 is a flowchart of a method for processing blockchain data according to an embodiment.

FIG. 6 is a flowchart of a method for processing blockchain data according to an embodiment. In the embodiment, the target service being a fundraising service is used as an example for illustration. The fundraising resource transfer value may be an amount of dispensed raised money, the resource transfer institution may be a raised money storage institution, and the fundraising resource transfer time may be a time when the raised money is dispensed. The method may be performed by a terminal device, wherein the terminal device may be a computer device such as a laptop computer or a desktop computer. The terminal device may be a terminal device for performing trust verification on data to be uploaded to a blockchain. The terminal device may be provided with a trusted execution environment. The trusted execution environment may be a TEE, may be implemented by a program written in a predetermined programming language, and may be a safe operation environment for data processing. The method may also be performed by a server and the like, and the server may also be provided with the above trusted execution environment TEE. The present embodiment of the present specification takes the method being performed by a terminal device as an example for description. The method may include the following steps.

In step S602, a query request from a fundraiser is received, and the query request is used to query flow information of raised money provided by the fundraiser.

In step S604, a preset smart contract is called, and data to be verified of the fundraising service is acquired from a blockchain, the data to be verified including circulation data generated during execution of the fundraising service and recorded in the blockchain.

The data to be verified may include the amount of dispensed raised money and a time when the raised money is dispensed.

In step S606, a relevant third-party authority for verifying authenticity of the data to be verified is determined as a raised money storage institution based on the amount of dispensed raised money and the time when the raised money is dispensed.

The raised money storage institution may be an organization or institution used to store the raised money provided by the fundraiser, such as a banking institution or a public welfare fund organization.

In step S608, a benchmark amount for dispensing raised money and a benchmark time for dispensing the raised money generated during the execution of the fundraising service and recorded in the raised money storage institution are acquired, and the benchmark amount for dispensing raised money and the benchmark time for dispensing the raised money are used as the benchmark circulation data.

In step S610, the data to be verified and the benchmark circulation data are acquired through a trusted program corresponding to a first trusted application for performing data verification processing on the terminal device, and the data to be verified and the benchmark circulation data are transferred to the TEE of the terminal device through the trusted program corresponding to the first trusted application.

In addition, in order to further ensure the security of the data to be verified and the benchmark circulation data, the data to be verified and the benchmark circulation data may also be transferred to the TEE of the terminal device in a ciphertext manner. For example, the first trusted application used for performing data verification processing on the terminal device transfers the data to be verified and the benchmark circulation data to the TEE of the terminal device in a ciphertext manner.

In an embodiment, where the above data to be verified and the benchmark circulation data have been encrypted, there may be no need to encrypt the data to be verified and the benchmark circulation data, or the data to be verified and benchmark circulation data may also be re-encrypted, which may be set according to actual situations.

For the data to be verified and benchmark circulation data that are encrypted, the following processing may be performed: in the trusted execution environment of the TEE, the data to be verified is decrypted separately to obtain the decrypted to-be-verified data, and in the trusted execution environment of the TEE, the benchmark circulation data is decrypted to obtain the decrypted benchmark circulation data.

In step S612, whether the data to be verified meets the verification rule is determined by using the trusted execution environment of the TEE and based on the circulation data in the data to be verified and the benchmark circulation data, and a verification result of the data to be verified is output.

There may be a variety of types of processing methods for determining whether the data to be verified meets the verification rule by using the trusted execution environment of the TEE and based on the circulation data in the data to be verified and the benchmark circulation data. An example processing method may include: in the trusted execution environment of the TEE, respectively decrypting the data to be verified and the benchmark circulation data to obtain decrypted to-be-verified data and decrypted benchmark circulation data; in the trusted execution environment of the TEE, processing the decrypted to-be-verified data and the decrypted benchmark circulation data respectively based on the verification rule to obtain first sub-data to be verified contained in the decrypted to-be-verified data and corresponding second sub-data to be verified contained in the decrypted benchmark circulation data; and in the trusted execution environment of the TEE, matching the first sub-data to be verified and the corresponding second sub-data to be verified respectively, and determining, based on matching results, whether the data to be verified meets the verification rule.

In step S614, the verification result of the data to be verified is acquired from the TEE based on the first trusted application, and the verification result of the data to be verified is uploaded to the blockchain.

In order to verify the authenticity of the data to be verified more flexibly, the data verification rule that has been set may also be modified, as described in steps S616 to S620.

In step S616, an update request for the verification rule in the TEE of the terminal device is received, the update request including rule data to be updated, and the rule data to be updated being ciphertext.

In step S618, the rule data to be updated is transferred to the TEE of the terminal device through the first trusted application.

In step S620, the rule data to be updated is decrypted in the trusted execution environment of the TEE, and the verification rule is updated based on the decrypted to-be-updated rule data.

In some embodiments, steps S616 to S620 may be performed after steps S602 to S614. In some embodiments, steps S616 to S620 may also be performed before steps S602 to S614, which is not limited in the embodiment of the present specification.

Embodiments of the present specification provide a method for processing blockchain data, which is applied to a terminal device provided with a trusted execution environment TEE. For data to be verified of a target service recorded in a blockchain, the data to be verified including circulation data generated during execution of the target service is acquired from the blockchain, and benchmark circulation data generated during the execution of the target service in a relevant third-party authority for verifying authenticity of the data to be verified may be acquired based on the target service. Through a first trusted application for performing data verification processing on the terminal device, the data to be verified and the benchmark circulation data are transferred to the TEE of the terminal device, thereby ensuring the security of the data to be verified and the benchmark circulation data in the process of transmitting to the TEE. In addition, a verification rule set in the trusted execution environment of the TEE is used to perform data verification on the data to be verified in the trusted execution environment of the TEE. Since TEE is a security operating environment for data processing, the security of the data to be verified and the benchmark circulation data in the process of being processed in the terminal device can be ensured, thus preventing the data to be verified and the benchmark circulation data from being tampered with, improving the security of the data to be verified in the verification process, and ensuring the accuracy and reliability of the verification result. In addition, the authenticity of the data to be verified is verified for the fundraising resource transfer value and the fundraising resource transfer time in the fundraising service or public welfare service, which further ensures the accuracy and reliability of the verification result.

Figure 7:
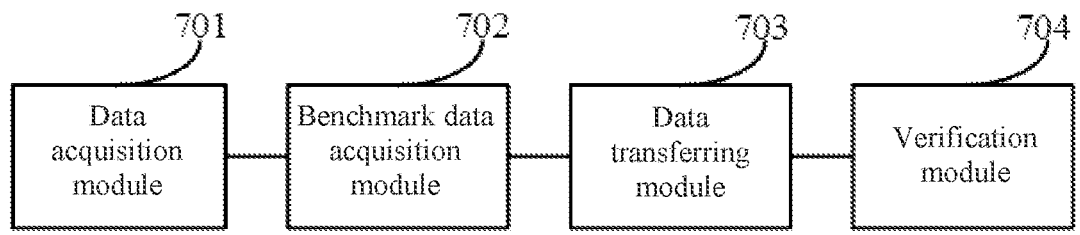
FIG. 7 is a schematic diagram of an apparatus for processing blockchain data according to an embodiment.

FIG. 7 is a schematic diagram of a blockchain data processing apparatus according to an embodiment. The apparatus is provided with a trusted execution environment TEE, and includes: a data acquisition module 701, a benchmark data acquisition module 702, a data transferring module 703, and a verification module 704.

The data acquisition module 701 is configured to acquire data to be verified of a target service from a blockchain, the data to be verified including circulation data generated during execution of the target service and recorded in the blockchain.

The benchmark data acquisition module 702 is configured to determine, based on the target service, a relevant third-party authority for verifying authenticity of the data to be verified, and acquire benchmark circulation data generated during the execution of the target service and recorded in the third-party authority.

The data transferring module 703 is configured to transfer the data to be verified and the benchmark circulation data to the TEE of the apparatus through a first trusted application for performing data verification processing on the apparatus, wherein the TEE is provided with a verification rule for performing data verification on the data to be verified for the first trusted application.

The verification module 704 is configured to determine whether the data to be verified meets the verification rule by using the trusted execution environment of the TEE and based on the circulation data in the data to be verified and the benchmark circulation data, and output a verification result of the data to be verified.

In an embodiment, the data to be verified includes resource transfer data corresponding to the target service and/or logistics data corresponding to the target service; and the benchmark data acquisition module 702 is configured to: determine, based on the resource transfer data corresponding to the target service, a relevant third-party authority for verifying authenticity of the resource transfer data as a resource storage institution, acquire benchmark resource transfer data generated during the execution of the target service and recorded in the resource storage institution, and use the benchmark resource transfer data as the benchmark circulation data; and/or determine, based on the logistics data corresponding to the target service, a relevant third-party authority for verifying authenticity of the logistics data as a traffic regulatory institution, acquire benchmark logistics data generated during the execution of the target service and recorded in the traffic regulatory institution, and use the benchmark logistics data as the benchmark circulation data.

In an embodiment, the resource transfer data includes a resource transfer value and/or a resource transfer time, and the logistics data includes information about a logistics path and/or a time for passing through a predetermined node in the logistics path.

In an embodiment, the data to be verified includes a fundraising resource transfer value and a fundraising resource transfer time; and the benchmark data acquisition module 702 includes: an institution determination unit configured to determine, based on the fundraising resource transfer value and the fundraising resource transfer time, a relevant third-party authority for verifying authenticity of the target data as a resource storage institution; and a benchmark data acquisition unit configured to acquire a benchmark fundraising resource transfer value and a benchmark fundraising resource transfer time generated during the execution of the target service and recorded in the resource storage institution, and use the benchmark fundraising resource transfer value and the benchmark fundraising resource transfer time as the benchmark circulation data.

In an embodiment, the apparatus further includes: a data uploading module configured to acquire the verification result of the data to be verified from the TEE based on the first trusted application, and upload the verification result of the data to be verified to the blockchain.

In an embodiment, the data transferring module 703 transfers the data to be verified and the benchmark circulation data to the TEE of the apparatus in a ciphertext manner through a first trusted application for performing data verification processing on the apparatus.

In an embodiment, the data transferring module 703 acquires the data to be verified and the benchmark circulation data through a trusted program corresponding to the first trusted application for performing data verification processing on the apparatus, and transfers the data to be verified and the benchmark circulation data to the TEE of the apparatus through the trusted program corresponding to the first trusted application.

In an embodiment, the apparatus further includes: an update request module configured to receive an update request for the verification rule in the TEE of the apparatus, the update request including rule data to be updated, and the rule data to be updated being ciphertext; a rule transfer module configured to transfer the rule data to be updated to the TEE of the apparatus through the first trusted application; and an updating module configured to decrypt the rule data to be updated in the trusted execution environment of the TEE, and update the verification rule based on the decrypted to-be-updated rule data.

In an embodiment, the verification rule is set based on one or more of the following: a data verification rule for the target service in the blockchain; a time condition for data generation in the blockchain; and an identity verification rule for a user uploading data in the blockchain.

In an embodiment, the data to be verified and the benchmark circulation data are ciphertext, and the verification module 704 includes: a decryption unit configured to, in the trusted execution environment of the TEE, decrypt the data to be verified and the benchmark circulation data respectively to obtain decrypted to-be-verified data and decrypted benchmark circulation data; a processing unit configured to, in the trusted execution environment of the TEE, process the decrypted to-be-verified data and the decrypted benchmark circulation data respectively based on the verification rule to obtain first sub-data to be verified contained in the decrypted to-be-verified data and corresponding second sub-data to be verified contained in the decrypted benchmark circulation data; and a verification unit configured to, in the trusted execution environment of the TEE, match the first sub-data to be verified and the corresponding second sub-data to be verified respectively, and determine, based on matching results, whether the data to be verified meets the verification rule.

Embodiments of the present specification provide an apparatus for processing blockchain data, which is provided with a trusted execution environment TEE. For data to be verified of a target service recorded in a blockchain, the data to be verified including circulation data generated during the execution of the target service is acquired from the blockchain, and benchmark circulation data generated during the execution of the target service in a relevant third-party authority for verifying authenticity of the data to be verified may be acquired based on the target service. Through a first trusted application on the apparatus for performing data verification processing, the data to be verified and the benchmark circulation data are transferred to the TEE of the apparatus, thereby ensuring the security of the data to be verified and the benchmark circulation data in the process of being transmitted to the TEE. In addition, a verification rule set in the trusted execution environment of the TEE is used to perform data verification on the data to be verified in the trusted execution environment of the TEE. Since the TEE is a safe operating environment for data processing, it ensures the security of the data to be verified and the benchmark circulation data in the process of being processed in the apparatus, thus preventing the data to be verified and the benchmark circulation data from being tampered with, improving the security of the data to be verified in the verification process, and ensuring the accuracy and reliability of the verification result. In addition, the authenticity of the data to be verified is verified for the fundraising resource transfer value and the fundraising resource transfer time in the fundraising service or public welfare service, which further ensures the accuracy and reliability of the verification result. In addition, for the resource transfer data and/or logistics data in the online transaction service, the authenticity of the data to be verified is verified, which further ensures the accuracy and reliability of the verification result.

Figure 8:
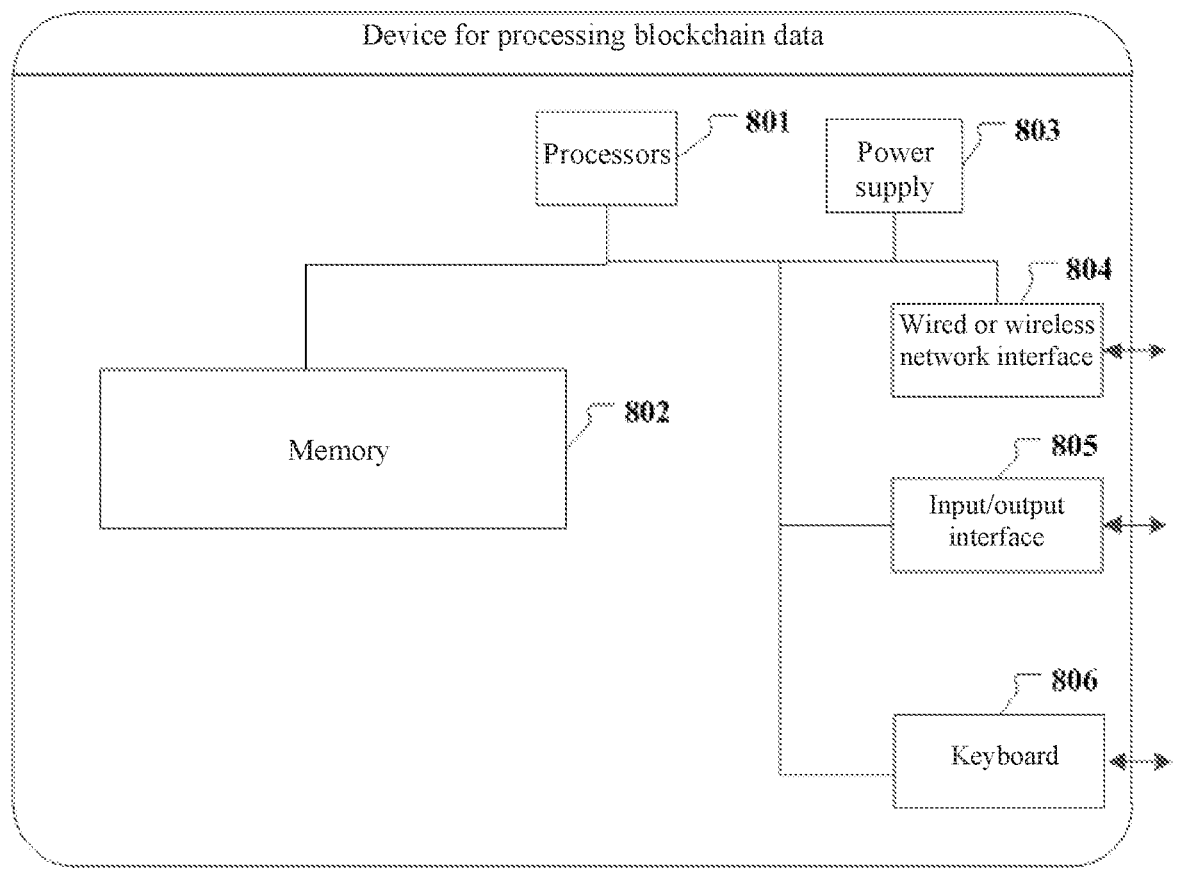
FIG. 8 is a schematic diagram of a device for processing blockchain data according to an embodiment.

FIG. 8 is a schematic diagram of a blockchain data processing device according to an embodiment. The blockchain data processing device may be any of the above terminal device or server. The terminal device may be a terminal device configured to verify authenticity of data that has been uploaded to a blockchain. The terminal device may be provided with a trusted execution environment, the trusted execution environment may be a TEE, and the trusted execution environment may be implemented through a program written in a predetermined programming language (that is, it may be implemented in the form of software).

The blockchain data processing device may differ greatly depending on different configurations or performance, and may include one or more processors 801 and memory 802. The memory 802 may store one or more storage application programs or data. The application program(s) stored in the memory 802 may include one or more modules (not shown), and each module may include a series of computer-executable instructions in the blockchain data processing device. Furthermore, the processor 801 may be configured to communicate with the memory 802, and execute, on the blockchain data processing device, the series of computer-executable instructions in the memory 802. The blockchain data processing device may further include one or more power supplies 803, one or more wired or wireless network interfaces 804, one or more input/output interfaces 805, and one or more keyboards 806.

In the present embodiment, the blockchain data processing device includes a memory and one or more programs. The one or more programs are stored in the memory, and may include one or one modules. Each module may include a series of computer-executable instructions in the blockchain data processing device, and is configured to execute, by the one or more processors, the one or more programs for performing the above method for processing blockchain data including, e.g., acquiring data to be verified of a target service from a blockchain, the data to be verified including circulation data generated during execution of the target service and recorded in the blockchain; determining, based on the target service, a relevant third-party authority for verifying authenticity of the data to be verified, and acquiring benchmark circulation data generated during the execution of the target service and recorded in the third-party authority; transferring the data to be verified and the benchmark circulation data to the TEE of the device through a first trusted application for performing data verification processing on the terminal device, wherein the TEE is provided with a verification rule for performing data verification on the data to be verified for the first trusted application; and determining whether the data to be verified meets the verification rule by using the trusted execution environment of the TEE and based on the circulation data in the data to be verified and the benchmark circulation data, and outputting a verification result of the data to be verified.

In an embodiment, the data to be verified includes resource transfer data corresponding to the target service and/or logistics data corresponding to the target service; and the determining, based on the target service, a relevant third-party authority for verifying authenticity of the data to be verified, and acquiring benchmark circulation data generated during the execution of the target service and recorded in the third-party authority includes: determining, based on the resource transfer data corresponding to the target service, a relevant third-party authority for verifying authenticity of the resource transfer data as a resource storage institution, acquiring benchmark resource transfer data generated during the execution of the target service and recorded in the resource storage institution, and using the benchmark resource transfer data as the benchmark circulation data; and/or determining, based on the logistics data corresponding to the target service, a relevant third-party authority for verifying authenticity of the logistics data as a traffic regulatory institution, acquiring benchmark logistics data generated during the execution of the target service and recorded in the traffic regulatory institution, and using the benchmark logistics data as the benchmark circulation data.

In an embodiment, the resource transfer data includes a resource transfer value and/or a resource transfer time, and the logistics data includes information about a logistics path and/or a time for passing through a predetermined node in the logistics path.

In an embodiment, the data to be verified includes a fundraising resource transfer value and a fundraising resource transfer time; the determining, based on the target service, a relevant third-party authority for verifying authenticity of the data to be verified, and acquiring benchmark circulation data generated during the execution of the target service and recorded in the third-party authority includes: determining, based on the fundraising resource transfer value and the fundraising resource transfer time, a relevant third-party authority for verifying authenticity of the target data as a resource storage institution; and acquiring a benchmark fundraising resource transfer value and a benchmark fundraising resource transfer time generated during the execution of the target service and recorded in the resource storage institution, and using the benchmark fundraising resource transfer value and the benchmark fundraising resource transfer time as the benchmark circulation data.

In an embodiment, the apparatus further performs: acquiring the verification result of the data to be verified from the TEE based on the first trusted application, and uploading the verification result of the data to be verified to the blockchain.

In an embodiment, the transferring the data to be verified and the benchmark circulation data to the TEE of the device through a first trusted application for performing data verification processing on the device includes: transferring the data to be verified and the benchmark circulation data to the TEE of the device in a ciphertext manner through a first trusted application for performing data verification processing on the device.

In an embodiment, the transferring the data to be verified and the benchmark circulation data to the TEE of the device through a first trusted application for performing data verification processing on the device includes: acquiring the data to be verified and the benchmark circulation data through a trusted program corresponding to the first trusted application for performing data verification processing on the device, and transferring the data to be verified and the benchmark circulation data to the TEE of the device through the trusted program corresponding to the first trusted application.

In an embodiment, the apparatus further performs: receiving an update request for the verification rule in the TEE of the device, the update request including rule data to be updated, and the rule data to be updated being ciphertext; transferring the rule data to be updated to the TEE of the device through the first trusted application; and decrypting the rule data to be updated in the trusted execution environment of the TEE, and updating the verification rule based on the decrypted to-be-updated rule data.

In an embodiment, the verification rule is set based on one or more of the following: a data verification rule for the target service in the blockchain; a time condition for data generation in the blockchain; and an identity verification rule for a user uploading data in the blockchain.

In an embodiment, the data to be verified and the benchmark circulation data are ciphertext, and the determining whether the data to be verified meets the verification rule by using the trusted execution environment of the TEE and based on the circulation data in the data to be verified and the benchmark circulation data includes performing the following processing in the trusted execution environment of the TEE: respectively decrypting the data to be verified and the benchmark circulation data to obtain decrypted to-be-verified data and decrypted benchmark circulation data; processing the decrypted to-be-verified data and the decrypted benchmark circulation data respectively based on the verification rule to obtain first sub-data to be verified contained in the decrypted to-be-verified data and corresponding second sub-data to be verified contained in the decrypted benchmark circulation data; and matching the first sub-data to be verified and the corresponding second sub-data to be verified respectively, and determining, based on matching results, whether the data to be verified meets the verification rule.

Embodiment of the present specification provide a device for processing blockchain data, which is provided with a trusted execution environment TEE. For data to be verified of a target service recorded in a blockchain, the data to be verified including circulation data generated during the execution of the target service is acquired from the blockchain, and benchmark circulation data generated during the execution of the target service in a relevant third-party authority for verifying authenticity of the data to be verified may be acquired based on the target service. Through a first trusted application on the device for performing data verification processing, the data to be verified and the benchmark circulation data are transferred to the TEE of the device, thereby ensuring the security of the data to be verified and the benchmark circulation data in the process of being transmitted to the TEE. In addition, a verification rule set in the trusted execution environment of the TEE is used to perform data verification on the data to be verified in the trusted execution environment of the TEE. Since the TEE is a safe operating environment for data processing, it ensures the security of the data to be verified and the benchmark circulation data in the process of being processed in the device, thus preventing the data to be verified and the benchmark circulation data from being tampered with, improving the security of the data to be verified in the verification process, and ensuring the accuracy and reliability of the verification result. In addition, the authenticity of the data to be verified is verified for the fundraising resource transfer value and the fundraising resource transfer time in the fundraising service or public welfare service, which further ensures the accuracy and reliability of the verification result. In addition, for the resource transfer data and/or logistics data in the online transaction service, the authenticity of the data to be verified is verified, which further ensures the accuracy and reliability of the verification result.

The foregoing describes example embodiments of the present specification. Other embodiments may fall within the scope of the appended claims. In some cases, the actions or steps described above can be performed in a different order and can still achieve desired results. In addition, the processes depicted in the drawings do not necessarily require the particular order shown or a sequential order to achieve the desired results. In some embodiments, multi-tasking and parallel processing may also be feasible or may be advantageous.

With the development of technologies, nowadays, the improvement to many method flows can be implemented as a direct improvement to a hardware circuit structure. Designers program improved method flows into hardware circuits to obtain corresponding hardware circuit structures. For example, a Programmable Logic Device (PLD) (e.g., a Field Programmable Gate Array (FPGA)) is such an integrated circuit, and its logic functions are determined by a user through programming the device. Designers "integrate" a digital system onto a piece of PLD by independent programming without asking a chip manufacturer to design and manufacture a dedicated integrated circuit chip. Moreover, at present, instead of manually making an integrated circuit chip, this programming is also implemented mostly using "logic compiler" software, which is similar to a software compiler used for program development and compilation. However, the original code before compilation also has to be compiled using a specific programming language, which is known as a hardware description language (HDL). There is not only one, but many kinds of HDLs, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, and RHDL (Ruby Hardware Description Language). At present, VHDL (Very-High-Speed Integrated Circuit Hardware Description Language) and Verilog are the most commonly used. Those skilled in the art should also know that a hardware circuit for implementing a logic method flow can be easily acquired by slightly logically programming the method flow using the above several hardware description languages and programming it into an integrated circuit.

In some embodiments, a controller may be used to implement the above methods. For example, the controller may be in the form of a microprocessor or processor and a computer-readable medium storing computer-readable program code (such as software or firmware) executable by this (micro)processor, a logic gate, a switch, an application specific integrated circuit (ASIC), a programmable logic controller, and an embedded microcontroller. Examples of the controller include, but are not limited to, the following microcontrollers: ARC 625D, Atmel AT91SAM, Microchip PIC18F26K20, and Silicone Labs C8051F320. A controller of a memory may also be implemented as part of the control logic of the memory. Those skilled in the art also know that, in addition to implementing a controller in the form of pure computer-readable program code, the method steps may be logically programmed to enable the controller to realize the same function in the form of a logic gate, a switch, a special integrated circuit, a programmable logic controller, an embedded micro-controller, or the like.

The systems, devices, modules, or apparatuses in the above embodiments may be implemented by a computer chip or entity, or by a product with a certain function. A typical implementing device is a computer. For example, the computer may be a personal computer, a laptop computer, a cellular phone, a camera phone, a smart phone, a personal digital assistant, a media player, a navigation device, an email device, a game console, a tablet computer, a wearable device, or a combination of any of these devices.

The embodiments are described with reference to flowcharts and/or block diagrams. It should be understood that each flow and/or block in the flowcharts and/or block diagrams and a combination of flows and/or blocks in the flowcharts and/or block diagrams may be implemented by computer program instructions. These computer program instructions can be provided to a processor of a general-purpose computer, a special-purpose computer, an embedded processor, or another programmable blockchain data processing device to produce a machine, so that the instructions executed by the processor of the computer or another programmable blockchain data processing device produce an apparatus for realizing the functions specified in one or more flows of the flow charts and/or one or more blocks of the block diagrams.

These computer program instructions may also be stored in a computer-readable medium that can direct a computer or another programmable blockchain data processing device to work in a specific manner, so that the instructions stored in this computer-readable medium produce an article of manufacture including an instruction apparatus which implements the functions specified in one or more flows of the flowcharts and/or one or more blocks of the block diagrams.

These computer program instructions can also be loaded onto a computer or another programmable blockchain data processing device, so that a series of operation steps are performed on the computer or another programmable device to produce computer-implemented processing, so that the instructions executed on the computer or another programmable device provide steps for implementing the functions specified in one or more flows of the flow charts and/or one or more blocks of the block diagrams.

The computer-readable medium includes permanent and non-permanent, removable and non-removable media, which may implement storage of information by using any method or technology. The information may be computer-readable instructions, data structures, modules of programs, or other data. Examples of computer storage media include, but are not limited to, a phase change memory (PRAM), a static random access memory (SRAM), a dynamic random access memory (DRAM), other types of random access memories (RAM), read-only memories (ROM), electrically erasable programmable read-only memories (EEPROM), flash memories or other memory technologies, read-only compact disc read-only memories (CD-ROM), digital versatile disks (DVD) or other optical storage, magnetic tape cassettes, magnetic tape magnetic disk storage or other magnetic storage devices, or any other non-transmission media, and the computer storage media may be used to store information that may be accessed by computing devices. As defined herein, the computer-readable medium does not include transitory computer readable media (transitory media), such as a modulated data signal and a carrier.

One or more embodiments of the present specification may be implemented using computer-executable instructions executed by a computer, such as a program module. Generally, the program module includes a routine, a program, an object, an assembly, a data structure, and the like used for executing a specific task or implementing a specific abstract data type. One or more embodiments of the present specification may also be practiced in distributed computing environments in which tasks are performed by remote processing devices connected through a communication network. In the distributed computing environments, the program module may be located in local and remote computer storage media including a storage device.

The foregoing description is merely example embodiments of the present specification and is not used to limit the present specification. For those skilled in the art, the present specification may have various alterations and changes. Any modification, equivalent replacement, improvement, and the like made within the spirit and principle of the present specification shall be included in the scope of the claims.

The invention claimed is:

1. A method for processing blockchain data, applied to a terminal device provided with a trusted execution environment, the method comprising:
   acquiring, from a blockchain, data to be verified of a target service, the data to be verified comprising circulation data generated during execution of the target service and recorded in the blockchain;
   determining, based on the target service, a relevant third-party authority for verifying authenticity of the data to be verified, and acquiring benchmark circulation data generated during the execution of the target service and recorded in the third-party authority;
   transferring the data to be verified and the benchmark circulation data to the trusted execution environment of the terminal device through a first trusted application for performing data verification processing on the terminal device, wherein the trusted execution environment is provided with a verification rule for performing data verification on the data to be verified for the first trusted application; and
   determining whether the data to be verified meets the verification rule by using the trusted execution environment and based on the circulation data in the data to be verified and the benchmark circulation data, and outputting a verification result of the data to be verified.

2. The method according to claim 1, wherein the data to be verified comprises at least one of resource transfer data corresponding to the target service or logistics data corresponding to the target service; and
   the determining, based on the target service, the relevant third-party authority for verifying authenticity of the data to be verified, and acquiring the benchmark circulation data generated during the execution of the target service and recorded in the third-party authority comprises at least one of:
   determining, based on the resource transfer data corresponding to the target service, a relevant third-party authority for verifying authenticity of the resource transfer data as a resource storage institution, acquiring benchmark resource transfer data generated during the execution of the target service and recorded in the resource storage institution, and using the benchmark resource transfer data as the benchmark circulation data; or
   determining, based on the logistics data corresponding to the target service, a relevant third-party authority for verifying authenticity of the logistics data as a traffic regulatory institution, acquiring benchmark logistics data generated during the execution of the target service and recorded in the traffic regulatory institution, and using the benchmark logistics data as the benchmark circulation data.

3. The method according to claim 2, wherein the resource transfer data comprises at least one of a resource transfer value or a resource transfer time, and the logistics data comprises at least one of information about a logistics path or a time for passing through a predetermined node in the logistics path.

4. The method according to claim 1, wherein the data to be verified comprises a fundraising resource transfer value and a fundraising resource transfer time; and
   the determining, based on the target service, the relevant third-party authority for verifying authenticity of the data to be verified, and acquiring the benchmark circulation data generated during the execution of the target service and recorded in the third-party authority comprises:
   determining, based on the fundraising resource transfer value and the fundraising resource transfer time, a relevant third-party authority for verifying authenticity of the data as a resource storage institution; and
   acquiring a benchmark fundraising resource transfer value and a benchmark fundraising resource transfer time generated during the execution of the target service and recorded in the resource storage institution, and using the benchmark fundraising resource transfer value and the benchmark fundraising resource transfer time as the benchmark circulation data.

5. The method according to claim 1, further comprising:
   acquiring the verification result of the data to be verified from the trusted execution environment based on the first trusted application, and uploading the verification result of the data to be verified to the blockchain.

6. The method according to claim 1, wherein the transferring the data to be verified and the benchmark circulation data to the trusted execution environment of the terminal device through the first trusted application for performing data verification processing on the terminal device comprises:
   transferring the data to be verified and the benchmark circulation data to the trusted execution environment of the terminal device in a ciphertext manner through the first trusted application for performing data verification processing on the terminal device.

7. The method according to claim 1, wherein the transferring the data to be verified and the benchmark circulation data to the trusted execution environment of the terminal device through the first trusted application for performing data verification processing on the terminal device comprises:
   acquiring the data to be verified and the benchmark circulation data through a trusted program corresponding to the first trusted application for performing data verification processing on the terminal device, and transferring the data to be verified and the benchmark circulation data to the trusted execution environment of the terminal device through the trusted program corresponding to the first trusted application.

8. The method according to claim 1, further comprising:
receiving an update request for the verification rule in the trusted execution environment of the terminal device, the update request comprising rule data to be updated, and the rule data to be updated being ciphertext;
transferring the rule data to be updated to the trusted execution environment of the terminal device through the first trusted application; and
decrypting the rule data to be updated in the trusted execution environment, and updating the verification rule based on the decrypted to-be-updated rule data.

9. The method according to claim 8, wherein the verification rule is set based on one or more of:
a data verification rule for the target service in the blockchain;
a time condition for data generation in the blockchain; and
an identity verification rule for a user uploading data in the blockchain.

10. The method according to claim 1, wherein the data to be verified and the benchmark circulation data are ciphertext, and the determining whether the data to be verified meets the verification rule by using the trusted execution environment and based on the circulation data in the data to be verified and the benchmark circulation data comprises performing in the trusted execution environment:
respectively decrypting the data to be verified and the benchmark circulation data to obtain decrypted to-be-verified data and decrypted benchmark circulation data;
processing the decrypted to-be-verified data and the decrypted benchmark circulation data respectively based on the verification rule to obtain first sub-data to be verified contained in the decrypted to-be-verified data and corresponding second sub-data to be verified contained in the decrypted benchmark circulation data; and
matching the first sub-data to be verified and the corresponding second sub-data to be verified respectively, and determining, based on matching results, whether the data to be verified meets the verification rule.

11. A device for processing blockchain data, the device being provided with a trusted execution environment and comprising:
a processor; and
a memory storing instructions executable by the processor,
wherein the processor is configured to:
acquire, from a blockchain, data to be verified of a target service, the data to be verified comprising circulation data generated during execution of the target service and recorded in the blockchain;
determine, based on the target service, a relevant third-party authority for verifying authenticity of the data to be verified, and acquire benchmark circulation data generated during the execution of the target service and recorded in the third-party authority;
transfer the data to be verified and the benchmark circulation data to the trusted execution environment of the device through a first trusted application for performing data verification processing on the device, wherein the trusted execution environment is provided with a verification rule for performing data verification on the data to be verified for the first trusted application; and
determine whether the data to be verified meets the verification rule by using the trusted execution environment and based on the circulation data in the data to be verified and the benchmark circulation data, and output a verification result of the data to be verified.

12. The device according to claim 11, wherein the data to be verified comprises at least one of resource transfer data corresponding to the target service or logistics data corresponding to the target service; and
the processor is further configured to perform at least one of:
determining, based on the resource transfer data corresponding to the target service, a relevant third-party authority for verifying authenticity of the resource transfer data as a resource storage institution, acquiring benchmark resource transfer data generated during the execution of the target service and recorded in the resource storage institution, and using the benchmark resource transfer data as the benchmark circulation data; or
determining, based on the logistics data corresponding to the target service, a relevant third-party authority for verifying authenticity of the logistics data as a traffic regulatory institution, acquiring benchmark logistics data generated during the execution of the target service and recorded in the traffic regulatory institution, and using the benchmark logistics data as the benchmark circulation data.

13. The device according to claim 12, wherein the resource transfer data comprises at least one of a resource transfer value or a resource transfer time, and the logistics data comprises at least one of information about a logistics path or a time for passing through a predetermined node in the logistics path.

14. The device according to claim 11, wherein the data to be verified comprises a fundraising resource transfer value and a fundraising resource transfer time; and the processor is further configured to:
determine, based on the fundraising resource transfer value and the fundraising resource transfer time, a relevant third-party authority for verifying authenticity of the data as a resource storage institution; and
acquire a benchmark fundraising resource transfer value and a benchmark fundraising resource transfer time generated during the execution of the target service and recorded in the resource storage institution, and use the benchmark fundraising resource transfer value and the benchmark fundraising resource transfer time as the benchmark circulation data.

15. The device according to claim 11, wherein the processor is further configured to:
acquire the verification result of the data to be verified from the trusted execution environment based on the first trusted application, and upload the verification result of the data to be verified to the blockchain.

16. The device according to claim 11, wherein the processor is further configured to:
transfer the data to be verified and the benchmark circulation data to the trusted execution environment of the device in a ciphertext manner through the first trusted application for performing data verification processing on the device.

17. The device according to claim 11, wherein the processor is further configured to:
acquire the data to be verified and the benchmark circulation data through a trusted program corresponding to the first trusted application for performing data verification processing on the device, and transfer the data to be verified and the benchmark circulation data to the trusted execution environment of the device through the trusted program corresponding to the first trusted application.

18. The device according to claim 11, wherein the processor is further configured to:
receive an update request for the verification rule in the trusted execution environment of the device, the update request comprising rule data to be updated, and the rule data to be updated being ciphertext;
transfer the rule data to be updated to the trusted execution environment of the device through the first trusted application; and
decrypt the rule data to be updated in the trusted execution environment, and update the verification rule based on the decrypted to-be-updated rule data.

19. The device according to claim 18, wherein the verification rule is set based on one or more of:
a data verification rule for the target service in the blockchain;
a time condition for data generation in the blockchain; and
an identity verification rule for a user uploading data in the blockchain.

20. A non-transitory computer-readable storage medium having stored therein instructions that, when executed by a processor of a terminal device, cause the terminal device to perform a method for processing blockchain data, the terminal device being provided with a trusted execution environment, the method comprising:
acquiring, from a blockchain, data to be verified of a target service, the data to be verified comprising circulation data generated during execution of the target service and recorded in the blockchain;
determining, based on the target service, a relevant third-party authority for verifying authenticity of the data to be verified, and acquiring benchmark circulation data generated during the execution of the target service and recorded in the third-party authority;
transferring the data to be verified and the benchmark circulation data to the trusted execution environment of the terminal device through a first trusted application for performing data verification processing on the terminal device, wherein the trusted execution environment is provided with a verification rule for performing data verification on the data to be verified for the first trusted application; and
determining whether the data to be verified meets the verification rule by using the trusted execution environment and based on the circulation data in the data to be verified and the benchmark circulation data, and outputting a verification result of the data to be verified.

* * * * *